United States Patent
Lin

[11] Patent Number: 6,157,147
[45] Date of Patent: Dec. 5, 2000

[54] POWER TRANSMISSION APPARATUS

[75] Inventor: Pan-Chien Lin, 4F, No. 7, Lane 446, Fuhsing Rd., Shu-Lin Chen, Taipei Hsien, Taiwan

[73] Assignee: Pan-Chien Lin, Taipei Hsien, Taiwan

[21] Appl. No.: 09/063,268

[22] Filed: Apr. 20, 1998

[51] Int. Cl.[7] .................................................. H02K 7/116
[52] U.S. Cl. .................................. 318/9; 318/8; 318/11; 318/12; 318/13; 318/14
[58] Field of Search .................................. 318/3, 4, 8, 9, 318/11–15

[56] References Cited

U.S. PATENT DOCUMENTS

| | | | |
|---|---|---|---|
| 1,706,276 | 3/1929 | Zweigbergk | 318/13 X |
| 1,971,141 | 8/1934 | Holst . | |
| 2,018,336 | 10/1935 | Weichsel | 318/13 X |
| 2,179,364 | 11/1939 | Weber | 318/13 X |
| 2,480,065 | 8/1949 | Wanner . | |
| 2,567,202 | 9/1951 | Goertz | 318/13 |
| 2,829,327 | 4/1958 | Cluwen | 318/13 X |
| 2,929,974 | 3/1960 | Wells . | |
| 2,951,397 | 9/1960 | Schroeder . | |
| 3,699,351 | 10/1972 | Addie | 290/13 |
| 3,754,174 | 8/1973 | Shibata | 318/9 |
| 3,789,281 | 1/1974 | Shibata | 318/696 |
| 3,861,485 | 1/1975 | Busch | 318/11 X |
| 4,130,172 | 12/1978 | Moody | 310/118 X |
| 4,405,028 | 9/1983 | Price | 310/115 X |
| 4,774,855 | 10/1988 | Murrell et al. | 74/687 |
| 5,364,319 | 11/1994 | Boll et al. | 475/224 |
| 5,562,566 | 10/1996 | Yang | 477/3 |

Primary Examiner—Bentsu Ro
Attorney, Agent, or Firm—Thomas, Kayden, Horstmeyer & Risley

[57] ABSTRACT

A power transmission apparatus manipulates the transmission of power of the mechanical and/or electrical form. The power transmission apparatus is constructed integrating together a power-transmitting device and a transmission interaction redistributing mechanism. The interaction redistributing mechanism redistributes, or remaps, an optimized section of the operating speed range of the power-transmitting device onto the full operating speed range, including the stall speed, of the power transmission apparatus. Full operating speed range, including low speeds, is optimized. In a mechanical implementation of the apparatus, an epicyclic gear train is utilized as the redistributing mechanism. In an electromagnetic implementation of the apparatus, a rotary commutator is utilized as the redistributing mechanism and the power-transmitting device is an electromagnetic device. The mechanical implementation is capable of handling mechanical-to-mechanical mode of power transmission. Various versions of the electromagnetic implementation are capable of handling either the mechanical-to-mechanical, electrical-to-mechanical, mechanical-to-electrical, electrical-to-electrical mode, or more than one of the four modes, of power transmission. Both the mechanical and the electromagnetic implementations are capable of power regeneration.

2 Claims, 17 Drawing Sheets

POWER TRANSMISSION APPARATUS

BACKGROUND

1. Field of the Invention

This invention relates in general to an apparatus for manipulating the transmission of power. In particular, this invention relates to an apparatus for optimized transmission of mechanical or electrical power produced by a power source to a load, with the transmitted power fulfilling the specific mechanical or electrical power requirement within the full operating speed range of the load.

2. Technical Background

Power is a measure to rate the flow of energy, or work done, per unit time. Electrical power has been conveniently available in households, in factories, and, for example, in the overhead power line system of electrified railway for various applications. On the other hand, mechanical power that is provided as raw motive power by prime movers such as internal combustion engines consuming fossil fuel is also convenient. In practical applications, these are the two forms of readily-available power source in modern society.

The term "power" is used herein as a general term to designate either the mechanical or the electrical form of power. For the discussion of the invention, "power transmission" thus broadly refers to the transmission of mechanical or electrical power to either mechanical or electrical power. Relevant forms of power concerning the manipulation of power transmission as performed by the apparatus of the invention thus include mechanical and electrical power.

When both mechanical and electrical forms of power are considered, there can be four possible modes of power transmission. In conventional terminology, the transmission of mechanical power to mechanical is generally referred as mechanical power transmission, as is in vehicular drive train applications. The transmission of electrical power to mechanical, when utilizing an electric motor, is referred to as electric motoring. In contrast, the transmission of mechanical power to electrical, when employing an electric generator, is electrical power generation. Electrical-to-electrical power transmission generally involves the regulation of voltage and/or frequency of the electrical power. In the extreme case of zero frequency of the AC electrical power, it becomes the DC electrical power.

The need for power transmission is based on one simple reason. Namely, the sources providing the power, either mechanical or electrical, are frequently operating to generate the power at conditions not directly desirable at the load that is consuming the power. Generally, the characteristic factors of power source and load concerned include, in the mechanical power, torque and speed and, in the electrical power, frequency and voltage. For both forms of power, efficiency is a factor of ever increasing importance. For example, considering the vast number of internal combustion engine-driven vehicles used world-wide, small improvements in vehicle power plant and transmission efficiencies can be translated into the huge conservation of petroleum consumption. In critical applications such as electric vehicle, the bottleneck of storage battery technology turns the efficiency of electric drive system into one of the most important design factors.

An internal combustion engine needs a transmission box to provide the torque-speed regulation in order to meet propulsion demands at the vehicle driving wheels. Conventional vehicle internal combustion engine does not provide stall torque, while every vehicle has to be accelerated from standstill. This means that an internal combustion engine which operates within a limited speed range—not including stall speed—must drive the load in a full operating speed range—including the stall speed. The transmission box in an automobile is used to perform this transmission of mechanical power along with the necessary torque/speed regulations. But traditional automobile transmissions built around multiple-speed-geared torque converters suffer drawbacks. They require the use of precision fluid logic valve mechanism to switch the torque converter among the three or more sets of gear train of different gear ratios. The multiple sets of gear trains installed in a typical transmission box, in which only one is functional at any given time, add to the overall weight of the system, and the torque converter operates with poor efficiency at low speeds.

An electric machine operating in the motoring mode—commonly known as the electric motor—does provide stall torque, but with poor efficiency. In large-power electric motor drives, poor starting-speed efficiency imposes heat dissipation problem that the drives must reduce their power rating at low operating speeds in order to prevent permanent damages caused by overheating. Though power electronics devices such as PWM (pulse-width modulation) systems do expand operating speed range and improve motor drive efficiencies, they are generally sophisticated and costly to build.

An electric machine operating in the generating mode as an electric generator is also constrained by input mechanical speed ranges. For example, a wind turbine driving an electric generator has a limitation of minimum wind speed. Below that minimum, the generator system is difficult, if not impossible, to generate an AC power that can be acceptable for house or industrial application.

Thus, when considered as machines for the transmission of the mechanical and/or electrical power in the generalized sense, conventional drive systems, either vehicle transmissions, electric motor drives or generators, all suffer from the low-efficiency performance characteristics at low operating speeds. Yet low-speed operation is a situation inevitable for practically all such power drives. In some situations such as vehicle transmissions operating in traffic congestion conditions, this poor-efficiency performance at low speeds deteriorates air pollution problem at a large scale considering the number of vehicles caught in the traffic. Most of these conventional power transmission machines, though optimized for a fraction, frequently at the high-speed end, of their respective full operating speed range, can not cover the full speed range with optimized performance. Electric motor drives employing digital-controlled power electronics systems can indeed improve overall performance than simple motors in their designed operating speed ranges. However, power electronics motor control systems are sophisticated and expensive to build.

For the foregoing reasons, there is a need for a power transmission apparatus that can transmit power within its full operating speed range with optimized performance characteristics.

SUMMARY

The invention is directed to a power transmission apparatus for transmitting power at optimized efficiencies within the full operating speed range. A power transmission apparatus having features of the invention comprises a power-transmitting means and a power transmission interaction redistributing means. The power-transmitting means comprises a first transmission interaction element and a second transmission interaction element and is connected to the input of the apparatus for receiving an external power at an input angular speed. The first and the second transmission interaction elements operate at a first and a second angular speed respectively for transmitting power via interaction between the two. The transmission interaction redistributing means is integrated with the power-transmitting means and the output of the apparatus. The power-transmitting interaction of the power-transmitting means operating at the first and the second angular speeds is redistributed onto the output by the transmission interaction redistributing means, and the output delivers the power to an external load at an output angular speed.

In a mechanical implementation of the invention, a power transmission apparatus having features of the invention comprises a power-transmitting means and an epicyclic gear train. The power-transmitting means comprises a driving element and a driven element and is connected to the input shaft of the apparatus for receiving an external mechanical power at an input angular speed. The driving and the driven elements of the power-transmitting means operate at a driving and a driven angular speed respectively for transmitting the mechanical power via interaction between the driving and the driven elements. The epicyclic gear train comprises a first, a second and a third gear, the second gear rotates in the same rotational direction as the third gear and at an angular speed slower than the third gear when the third gear is driven while the first gear is held stationary. The third gear is connected to the driving element of the power-transmitting means, the second gear is connected to the driven element of the power-transmitting means, and the first gear is connected to the output shaft of the apparatus. The power-transmitting interaction of the power-transmitting means operating at the driving and the driven angular speeds is redistributed onto the output shaft of the apparatus by the epicyclic gear train, and the output shaft delivers the mechanical power to the external load at an output angular speed.

In an electromagnetic implementation of the invention, a power transmission apparatus having features of the invention comprises an electromagnetic power-transmitting means and a rotary commutator. The electromagnetic power-transmitting means comprises a first electromagnetic element and a second electromagnetic element. The electromagnetic power-transmitting means receives the external power at an input angular speed, and the first and second electromagnetic elements operate at a first and a second angular speed respectively for transmitting power via electromagnetic interaction between the magnetic fields established by the first and second electromagnetic elements respectively. The rotary commutator magnetizes the first electromagnetic element and is integrated with the first and second electromagnetic elements of the electromagnetic power-transmitting means. The rotary commutator operates at a commutation angular speed to magnetize the first electromagnetic element and establishes in the first electromagnetic element a first rotating magnetic field rotating at an angular speed that is synchronous with the angular speed of a second rotating magnetic field established by the second electromagnetic element. The power-transmitting electromagnetic interaction of the electromagnetic power-transmitting means operating at the synchronized angular speed of the first and second rotating magnetic fields is redistributed onto the output of the apparatus by the rotary commutator, and the output delivers the power from the electromagnetic power-transmitting means to the external load at an output angular speed.

BRIEF DESCRIPTION OF THE DRAWINGS

These and other features, aspects, and advantages of the invention will become better understood with regard to the following description, appended claims, and accompanying drawings where:

DESCRIPTION

Figure 1:
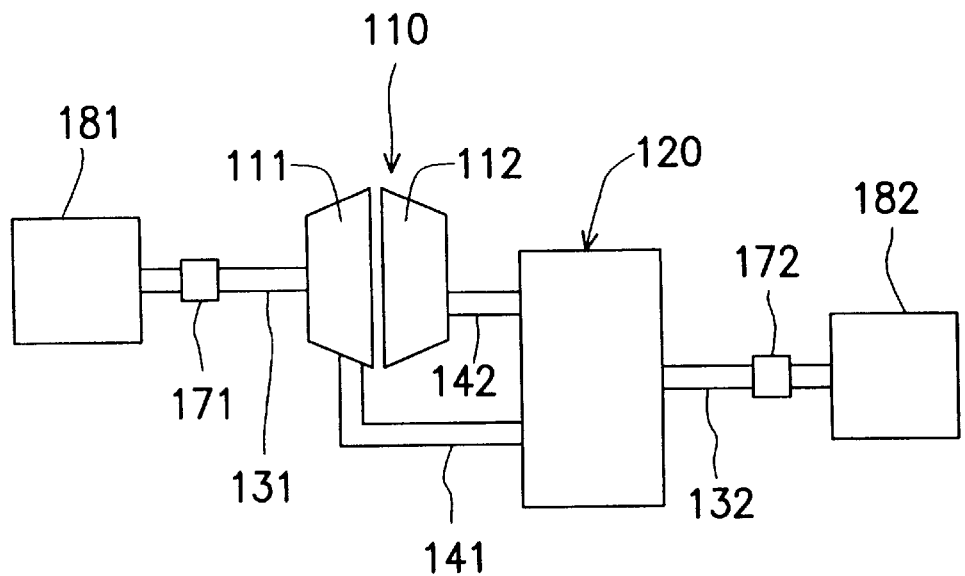
FIG. 1 schematically illustrates a generalized power transmission apparatus of the invention.

The best modes of implementation of the power transmission apparatus of the invention will be described in the following paragraphs. Before the various embodiments of the invention are described in detail, however, several general issues require clarification and definition.

A power transmission apparatus of the invention has an input and an output. When a power transmission apparatus of the invention performs power transmission, its input receives power from an external power source, and its output delivers power to an external load. The apparatus of the invention is suitable for the transmission of power in a generalized sense as the term power transmission is concerned. Mechanical and electrical forms of power are applicable. In various embodiments of the invention, either mechanical or electrical power can be input from the external power source to the power transmission apparatus, which may output either mechanical or electrical power to the external load.

In most of the embodiments of the invention to be exemplified below, the power transmission apparatus of the invention is also capable of performing the transmission of power, either mechanical or electrical, in the reversed direction of power flow. In other words, in addition to the normal operation of transmitting power from the input to the output of the apparatus, there can be occasions in which the same apparatus can be operated in the reversed direction of power flow, thus permitting power regeneration by the system making use of the power transmission apparatus. For example, in an electrical-to-mechanical power transmission apparatus of the invention that is integrated in the drive train of the traction system of an electric locomotive, the ability to perform the reverse-direction power transmission enables the locomotive to implement regenerative braking.

Further, for the purpose of describing the invention, when electrical power is concerned, a DC electrical power is considered to be a special case of a poly-phase AC electrical power. In other words, a DC electrical power is considered to be a single-phase AC with zero frequency. It is in effect an AC power that never changes the polarity of its electric potential.

The Generalized Power Transmission Apparatus

A power transmission apparatus in accordance with the invention is constructed by integrating a power-transmitting device with a transmission interaction redistributing mechanism. For the construction of the power transmission apparatus of the invention, the fundamental concept of the use of the redistributing mechanism and its integration with the power-transmitting device is two-fold. First, the power-transmitting interaction of the functional elements of the power-transmitting device employed to construct the apparatus is redistributed. Second, redistribution of the power-transmitting interaction achieves to constrain the operation of the power-transmitting device within its optimized performance range. The redistribution of the constrained operating speed range of the power-transmitting device allows the output of the apparatus to cover a full operating speed range including the stall speed.

FIG. 1 schematically illustrates a generalized power transmission apparatus of the invention. Essentially, the apparatus 100 is comprised of a power-transmitting means 110 and a power transmission interaction redistributing means 120. In the drawings, note that for similar embodiments of the power transmission apparatus of invention to be described below, the same reference numeral is used to designate like elements or elements with equivalent functionality, although such equivalent elements may differ greatly in construction.

In general, the power-transmitting means 110 is comprised of at least two power transmission interaction elements 111 and 112, in which a first element transmits power to a second for implementing its interaction of power transmission. The power transmitted inside the power-transmitting means 110 is received from an external power source 181 via an input 131 of the apparatus. The power-transmitting means 110 is integrated with the transmission interaction redistributing means 120 to make up the power transmission apparatus. The power received by the power-transmitting means 110 from the external power source 181 is then redistributed by the transmission interaction redistributing means 120 onto an output 132 of the apparatus and delivered to an external load 182.

The power transmission apparatus 100 of FIG. 1 is capable of handling mechanical and electrical power. When the power received by the apparatus is mechanical power, the input 131 of the apparatus is a rotary shaft that can be mechanically coupled to the external power source 181. In this case, the external power source 181 is a mechanical power source that generates motive power, and the input coupling 171 is a mechanical coupling. When the power received by the apparatus is an electrical power, the input 131 of the apparatus is an electrical lead that can be electrically connected to the external power source 181. In this case, the external power source 181 is an electrical power source that generates an electrical power, and the input coupling 171 is an electrical coupling.

At the output end of the apparatus, when the power delivered by the apparatus is a mechanical power, the output 132 of the apparatus is a rotary shaft that can be mechanically coupled to the external load 182. In this case, the external load 182 is a mechanical load that consumes mechanical motive power, and the output coupling 172 is a mechanical coupling. When the power delivered by the apparatus is an electrical power, the output 132 of the apparatus is an electrical lead that can be electrically connected to the external load 182. In this case, the external load 182 is an electrical load that consumes electrical power, and the output coupling 172 is an electrical coupling.

Internal to the power transmission apparatus, the integration between the elements of the power-transmitting means 110 and the elements of the power transmission interaction redistributing means 120 is schematically outlined in the drawing by a number of, for example, two couplings 141 and 142 in the depicted drawing. These couplings, depending on the specific type of implementation of the apparatus, may be either mechanical or electrical couplings.

When seeking the practical usefulness of the very fundamental concept of the invention, feasible implementations of the concept can be generally categorized into two groups. Based on the principle of operation internal to the power transmission apparatuses constructed, mechanical and electromagnetic implementations of the invention are possible. A mechanical implementation of the power transmission apparatus is one that the power transmission as performed by the power-transmitting means and interacting onto the output of the apparatus is redistributed by the interaction redistributing means via mechanical interaction. In contrast, an electromagnetic implementation of the apparatus is one that the power transmission is redistributed via electromagnetic interaction.

Both implementations incorporate the use of a power transmission interaction redistributing mechanism. For the electromagnetic implementation, the power-transmitting means used to constructed the apparatus of the invention must be an electric machine based on electromagnetism, though the electric machine used may be varied in structural details from the traditional ones widely used nowadays. The electromagnetic interaction in the power-transmitting means is integrated with that of the interaction redistributing means to facilitate the functionality of the power transmission apparatus of the invention.

On the other hand, the power-transmitting means used to construct the apparatus of the invention in a mechanical implementation may be all sorts of power-transmitting devices though, again, their structural details may be varied from their traditional counterparts. The mechanical power-transmitting interaction is redistributed integrally with the mechanical interaction of the redistributing means onto the output shaft of the apparatus via the mechanical interaction of force. Power-transmitting devices suitable for constructing a mechanical implementation of the apparatus of the invention may include electric machines, which are operated as simple mechanical power-transmitting devices, similar in functionality as in the case in which a hydraulic torque converter is used as the power-transmitting device.

The mechanical implementation of the power transmission apparatus of the invention is suitable for the mechanical-to-mechanical power transmission. Various types of the power transmission apparatus of the electromagnetic implementation may be utilized in the mechanical-to-mechanical, electrical-to-mechanical, mechanical-to-electrical, and electrical-to-electrical modes of power transmission respectively.

Mechanical power-transmitting devices suitable for constructing the power transmission apparatus of the invention can be varied. Many of the industry-proven mechanical power-transmitting devices or their modified variants can be applicable. They include, for example, hydraulic devices such as fluid coupler and torque converter, electromagnetic devices such as eddy-current clutch, motor-generator set and induction machine with permanent magnet field element, and so on. Modified versions of these conventional mechanical power-transmitting devices can be used. For example, a conventional torque converter can be modified so that its optimized operating characteristics, efficiency namely, is emphasized at its high-speed end in order to be particularly suitable for application in the power transmission apparatus of the invention. Though its low-speed performance would become even poorer due to the emphasis on high-speed performance, but a power transmission apparatus of the invention constructed utilizing such a modified torque converter does not require the torque converter to operate in this poor-performance low-speed range. On the other hand, electromagnetic power-transmitting devices suitable for constructing the power transmission apparatus of the invention are basically electric machines that perform electromagnetic motoring and generating based on the principle of electromagnetism. Many of the existing versions of electric machine such as AC induction machine, DC motor/generator, or their respective modified versions are applicable.

Figure 2:
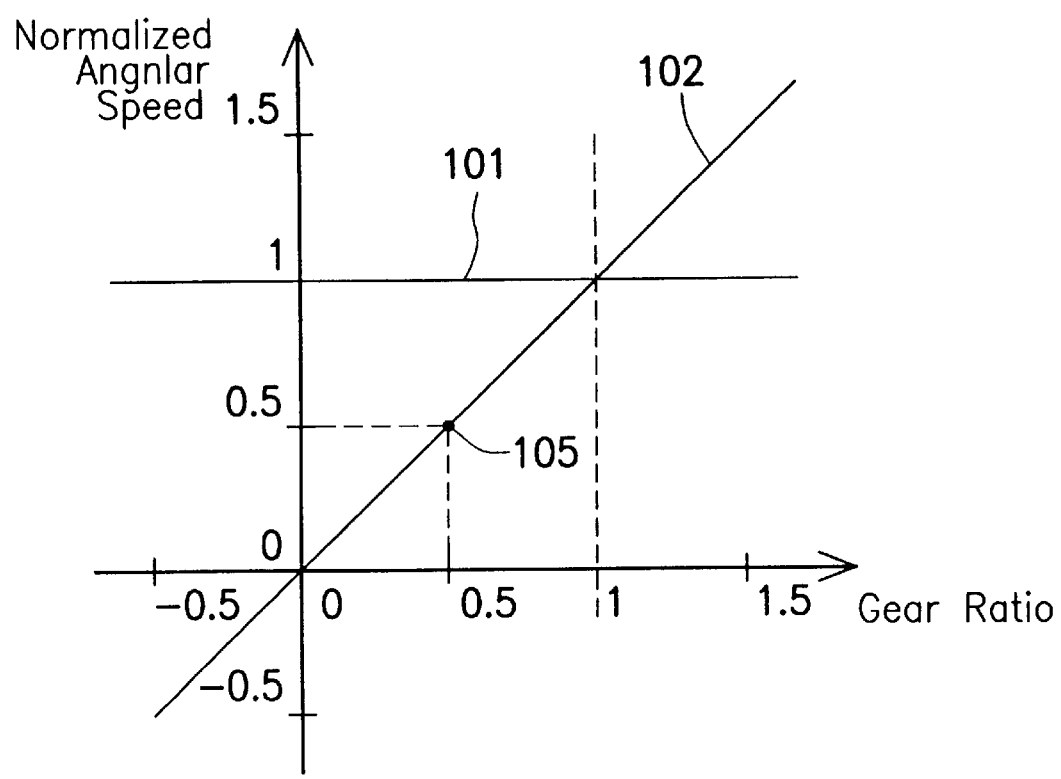
FIG. 2 shows the relationship between the normalized angular speed and the effective gear ratio of a power-transmitting device.

Before proceeding to elaborate into the fundamental concept of interaction redistribution of the invention, refer to FIG. 2 of the drawing. FIG. 2 is a diagram showing the relationship between the normalized angular speed and the gear ratio of a power-transmitting device. In the coordinate system, the axis of abscissae, the x-axis, represents the effective gear ratio of the power-transmitting device, and the axis of ordinates, the y-axis, represents the normalized angular speed of the constituent elements of the device that are rotary in either the mechanical or electrical sense. The effective gear ratio of a power-transmitting device is defined to be the ratio obtained by dividing the angular speed of the output to that of the input of the device. On the other hand, the normalized angular speed of any of the functional elements of the power-transmitting device is defined to be the ratio of the angular speeds obtained by dividing the angular speed of the specific element by a predetermined reference angular speed.

Thus, for the impeller of a torque converter, this normalized angular speed may be the ratio obtained by dividing the impeller angular speed by a selected reference angular speed of the internal combustion engine driving the torque converter. The reference angular speed of the internal combustion engine selected may be one at its rated power output, for example. If the engine drives the impeller of the torque converter directly, this normalized angular speed for the impeller becomes one, a case of unity normalized angular speed. On the other hand, the normalized angular speed of the turbine of this torque converter measured at the same reference angular speed is always less than unity. In the case of the rotor of an AC electric machine, this normalized angular speed is the ratio obtained by dividing the angular speed of the rotor shaft by that converted from the frequency of the feeding AC power source. The line frequency is normally 60 or 50 hertz (Hz) in most utility networks.

Note that the power transmission apparatus of the invention is itself a power-transmitting device whose characteristics can be described in the diagram of FIG. 2 as well. Thus, assuming that an external power source is delivering power to the input of the power-transmitting device at a fixed 100 percent, or unity, rated angular speed as represented by a horizontal input speed line 101, then the output of the device can be plotted in the coordinate system against the gear ratio over the axis of abscissae as a variable. The angular speed of the output can be represented by an output speed line 102 as a function of the device gear ratio. Thus, for example, at a gear ratio of 0.5, the output operates at 50 percent of the input speed, as is represented by the point 105 on the output speed line 102. Note that gear ratio can be greater than unity when the output operates at angular speeds faster than input, or it can be a negative number when the output rotates in the reverse direction with respect to the input.

In the conventional power-transmitting devices utilized as a mechanical power transmission system, it is frequently required that the driven element which functions as the output of the system be operative in a full speed range. To be practical for applications such as vehicle propulsion, the full speed range is usually required to include the stall speed, i.e, a speed of gear ratio zero in the speed/gear ratio diagram of FIG. 2. Thus, in the case of an automotive transmission based on the hydraulic torque converter, the converter turbine speed range must be stretched down to the stall point for the vehicle to start from standstill. Unfortunately, for a torque converter, low turbine speeds represent low energy efficiencies as is well known in the field.

Each of the power-transmitting devices that can be used to construct the power transmission apparatus of the invention has a driving and a driven element. When operating, the driving element propels the driven element via the transmission interaction between the two. In the mechanical implementation of the invention, the power-transmitting device may be one that relies on mechanical friction to operate as is in the case of a hydraulic torque converter or, it may also be one that operates under the principle of electromagnetic coupling as is in the case of an induction machine. In the electromagnetic implementation of the invention, the power-transmitting device may be some type of electric machine operating under the principle of electric motoring and generating. Whatever the case, the power-transmitting device is integrated with a transmission interaction redistributing mechanism so that redistribution of the power-transmitting interaction provides improved power transmission characteristics unique to the apparatus of the invention.

When incorporated into an apparatus of the invention, a power-transmitting device may be operated only in a selected small section of its own full operating speed range while permitting the output of the apparatus to cover a full operating speed range, including the stall speed. This small speed section can be selected to avoid the low-speed range that includes the stall speed where the performance of the power-transmitting device itself in terms of efficiency is poor. The power transmission apparatus of the invention employs a power transmission interaction redistributing mechanism to achieve this in a manner to be described below.

Figure 3:
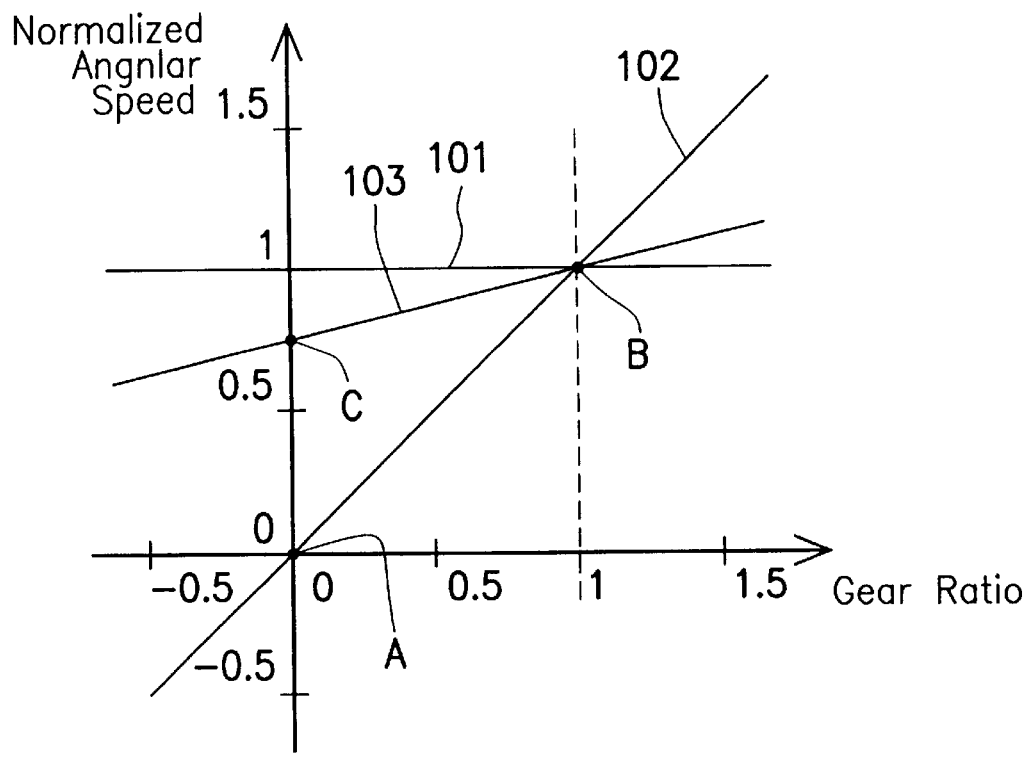
FIG. 3 shows the relationship between the normalized angular speed and the effective gear ratio of a generalized power transmission apparatus of FIG. 1.

FIG. 3 is a diagram showing the relationship between the normalized angular speed and the effective gear ratio of the generalized power transmission apparatus of FIG. 1. As is with FIG. 2, the axis of abscissae represents the effective gear ratio, and the axis of ordinates represents the angular speed of the functional elements of the apparatus. An input speed line 101 represents the input speed of the power transmission apparatus, assuming that the external power source 181 is providing power to the input 131 of the apparatus at a fixed 100 percent rated angular speed. Output 132 of the apparatus is required to cover the full operating speed range including the stall speed as is represented by an output speed line 102. A reasonable and practical full speed range may include the line section from point A to B along the output speed line 102, corresponding to a gear ratio range of from zero to unity on the x-axis.

In the generalized power transmission apparatus of FIG. 1, depending on the input configurational arrangement for the apparatus, the apparatus input 131 may either be connected to the driving element 111 or the driven element 112 of the power-transmitting device 110. In one mechanical implementation of the power transmission apparatus of FIG. 1, assume a power-transmitting device 110 has its driving element 111 connected to the input 131 of the apparatus. The driving element 111 receives the input power at the fixed speed along the horizontal speed line 101 of FIG. 3, and its driven element 112 driven to operate at speeds identified by a driven element speed line 103. The output speed line 102 in FIG. 3 represents the angular speed of the output shaft 132 of the apparatus.

Thus, with simultaneous reference to FIGS. 1 and 3, for the output 132 of the mechanical implementation of the apparatus to operate in a full speed range from zero to unity gear ratio as represented by the line section of points A and B on the output speed line 102, the driven element 112 of the power-transmitting device 110 has to operate correspondingly in its operating speed range of the line section from point C to B on the driven element speed line 103. The output speed range of the apparatus from point A to B on the output speed line 102 is a full output speed range of zero to 100 percent of the input speed applied to input 131. Corresponding to this full output speed range, the driven element 112 of the power-transmitting device 110 only has to operate in a small speed range of from, for example, about 75 to 100 percent of the speed of the driving element 111. To achieve this, the power transmission interaction redistributing mechanism 120 is integrated with the power-transmitting device 110 to implement this speed range redistribution, or, remapping for that matter.

Figure 4:
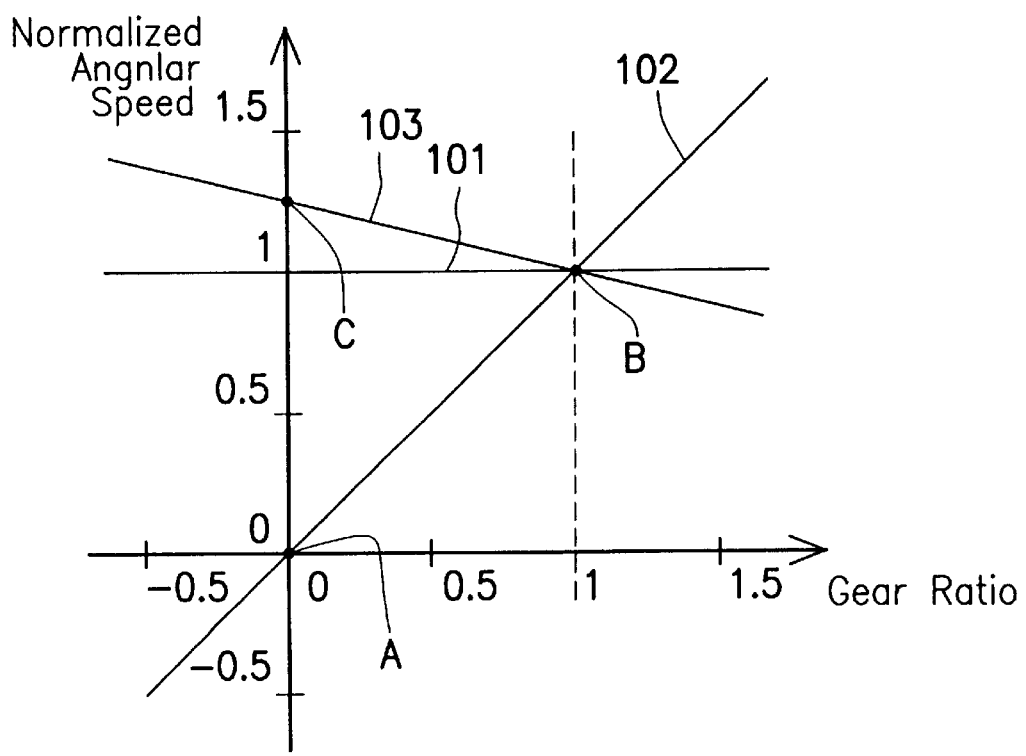
FIG. 4 shows the relationship between the normalized angular speed and the effective gear ratio of the generalized power transmission apparatus of FIG. 1 having a different configurational arrangement.

FIG. 4 illustrates the angular speed/gear ratio diagram of the mechanical implementation of the generalized power transmission apparatus of FIG. 1 employing a different configurational arrangement for the input of the apparatus. Unlike in the case of FIG. 3 in which the driving element 111 of the power-transmitting device 110 is connected to the apparatus input 131, in the arrangement of FIG. 4, the driving element 111 of device 110 is not directly connected to the apparatus input 131. Instead, the apparatus input 13 1 in the arrangement of FIG. 4 is connected to the driven element 112. In this case, speed line 103 of the driven element 112 now represents the input speed line of the apparatus. The concept of redistribution of a small section of the operating speed range of the power-transmitting device 110 onto the full speed range of the apparatus 100 is the same as is described for the arrangement of FIG. 3, except that the driven element 112 is maintained at fixed operating speed while the driving element 111 changes speed as the effective gear ratio of the apparatus changes.

By contrast, in the case of the electromagnetic implementation, the apparatus input 131 is always the driving element of the electromagnetic power-transmitting device 110 incorporated in the apparatus. In an electromagnetic implementation of the generalized power transmission apparatus of FIG. 1, an electromagnetic power-transmitting device 110 of the electric machine type has its driving and the driven elements 111 and 112 operating at the same angular speed regardless of the effective gear ratio of the apparatus output. Thus, in the case of the electromagnetic implementation of the apparatus, the concept of redistribution of the transmission interaction becomes redistributing, instead of a small range, a fixed operating speed of the power-transmitting device 110 onto the full speed range of the apparatus 100. Similar as in the mechanical implementation, this fixed operating speed for the power-transmitting device 110 of the electromagnetic implementation can be optimally selected.

For example, the driving element of an electromagnetic power-transmitting device may be the field element of an electric machine that generates a rotating magnetic field. The driven element may, on the other hand, be an armature that is a magnetization-redistributing electromagnetic winding assembly generating another magnetic field rotating at the same angular speed as that of the driving element. In this case, in the diagram of FIG. 3, the driven element speed line 103 becomes superimposed on the input speed line 101. In other words, speed line 101 now represents the angular speed of both the driving 111 and the driven element 112 of the electromagnetic power-transmitting device 110 employed to construct the apparatus of the invention. Output speed line 102 still represents the angular speed of the apparatus output 132, and the line 103 is non-existent in the case of the electromagnetic implementation. In this case, the diagram of FIG. 3 effectively reduces to that of FIG. 2 which is more suitable for describing the electromagnetic implementation of the apparatus of the invention.

For the electromagnetic implementation of the apparatus of the invention, the respective magnetic fields of the driving and the driven elements must be synchronized, just as is in the case of a conventional AC synchronous motor. In an AC synchronous motor, the permanent magnet rotor or its electromagnet equivalent must be rotating synchronous to the rotating magnetic field generated by the field winding. Out of synchronization between the two leads to lock-up of the motor. By contrast, in the mechanical implementation of the power transmission apparatus of the invention, there must be a slip between the driving and the driven elements of the power-transmitting device such as is in a hydraulic torque converter. The driven element does not reach to 100 percent the speed of the driving element.

Note that in the case of an apparatus of the invention that involves the transmission of electrical power, the axis of ordinates in FIGS. 2 and 3 represents the ratio of frequencies of the AC electrical power, either input or output. The effective gear ratio, the ratio between the frequencies of the AC output and input power, is represented by the axis of abscissae.

The Mechanical Implementation of the Apparatus

Thus, the generalized power transmission apparatus of the invention as depicted in FIG. 1 is capable of delivering good performance at the low-speed end of its entire output operating speed range. For example, in the case of a mechanical implementation that performs mechanical-to-mechanical power transmission or, an electromagnetic implementation that performs electrical-to-mechanical power transmission, both of which finds application in vehicle drive trains, good low-speed performance means that the drive train complexity can be reduced while enjoying improved low-speed efficiencies. The following paragraphs describe the embodiments of these mechanical and electromagnetic implementations of the power transmission apparatus of the invention.

A mechanical implementation of the power transmission apparatus of the invention is defined to be one that incorporates a power-transmitting device and a mechanical transmission interaction redistributing mechanism. The two constituent parts are integrated together in the manner according to the invention so as to form an apparatus that is operated as a mechanical-to-mechanical power transmission system. The mechanical transmission interaction redistributing mechanism may be a simple epicyclic gear train. This epicyclic gear train may either be the standard planetary gear train having a ring gear, the all-spur planetary gear train without a ring gear, or the differential gear train. For the purpose of facilitating the mechanical redistribution of the power transmission interaction, these gear trains are considered to be and referred to herein as epicyclic gear trains.

As a mechanical transmission interaction redistributing mechanism, the standard planetary gear train is one that incorporates a set of pinion gears held by a framework of a carrier, which allows both the ring and sun gears to rotate with respect to the carrier gear. In the same sense, the all-spur planetary gear train is one that incorporates a set of double-pinion gears held by a carrier that allows both the small and large sun gears to rotate with respect to the carrier gear. Similarly, the differential gear train is one that incorporates a set of pinion gears held by a carrier that allows both its bevel gears to rotate with respect to the carrier gear. In the following descriptions, the pinion carrier is referred to as the carrier gear.

One distinguished and essential characteristics of the mechanical implementation of the power transmission apparatus of the invention is that all gears and the pinion carrier of the epicyclic gear train utilized as the interaction redistributing means rotate when the apparatus operates to transmit power. Though the standard planetary, the all-spur planetary and the differential gear trains appear to be structurally different, they are topologically equivalent. For the purpose of functioning as the redistributing means in the apparatus of the invention, with its pinion gears, the carrier gear of the gear train permits the other two gears, be it the ring and sun gears in the standard planetary, the small and large sun gears in the all-spur planetary or the side bevels in the differential, to mesh with the pinion gears so as to rotate at speeds and directions determined by the gear train geometry.

Figure 5:
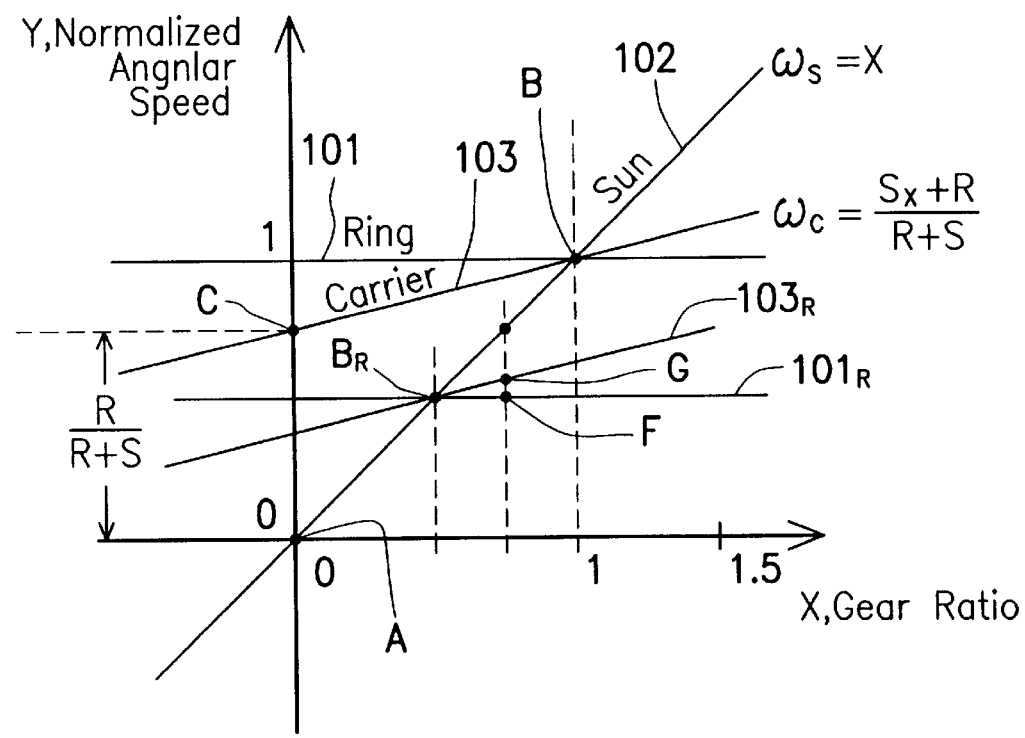
FIGS. 5, 6 and 7 respectively illustrate the angular speed relationships of the gear elements in a standard planetary, all-spur planetary and differential gear trains when utilized as a transmission interaction redistributing mechanism for constructing a mechanical implementation of the power transmission apparatus of FIG. 1
Figure 6:
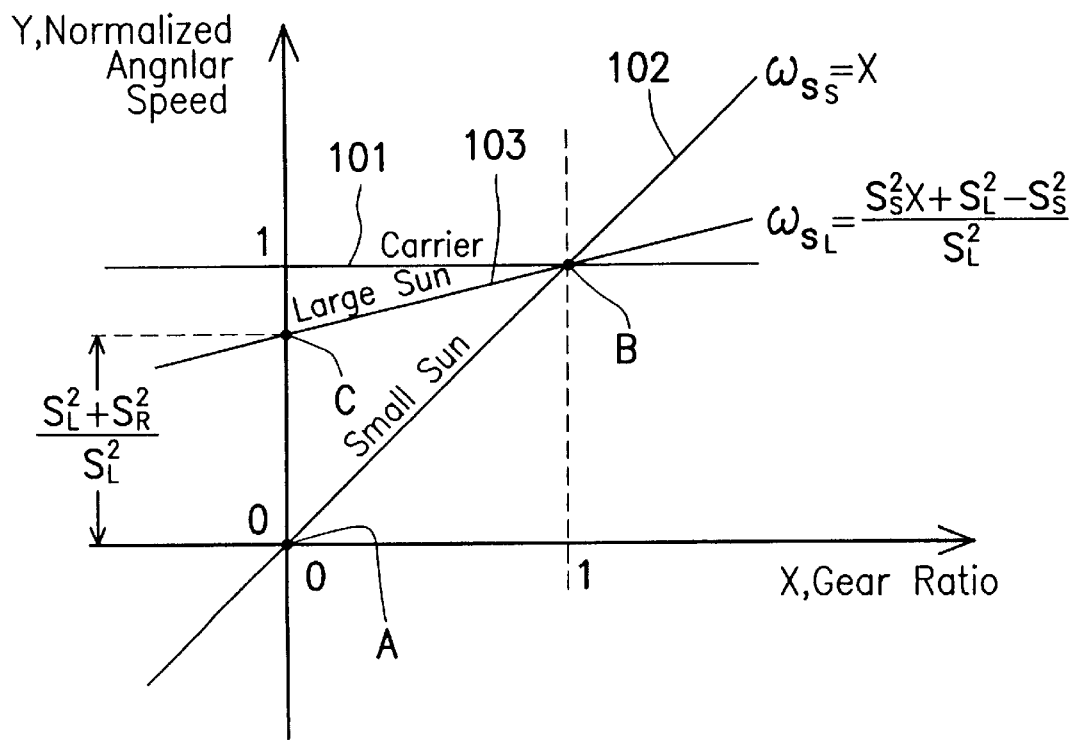
Figure 7:
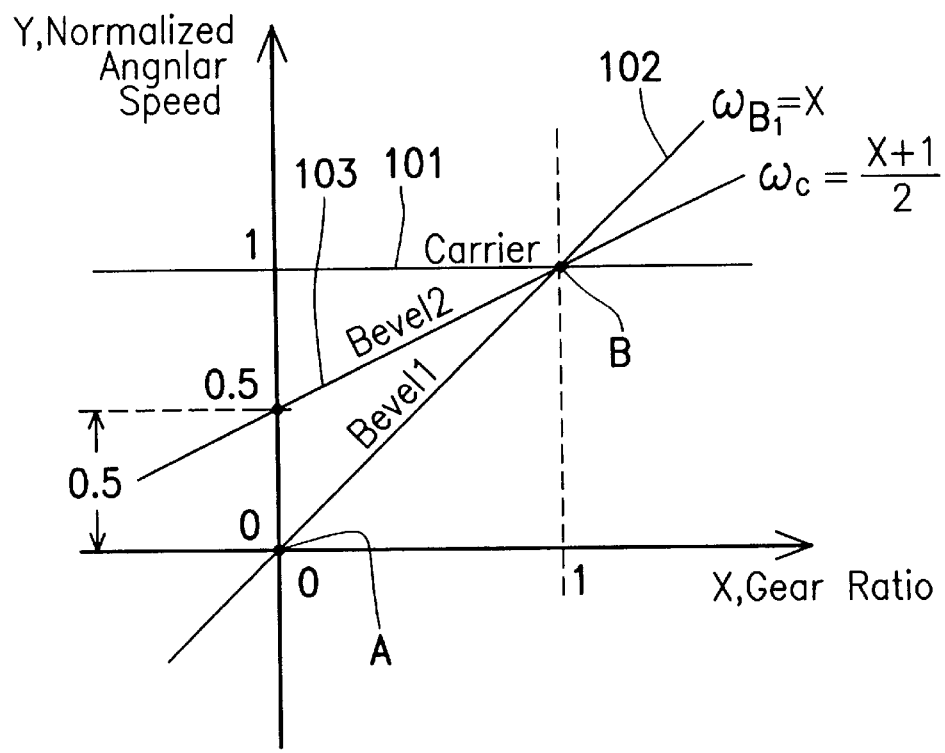
Figure 8:
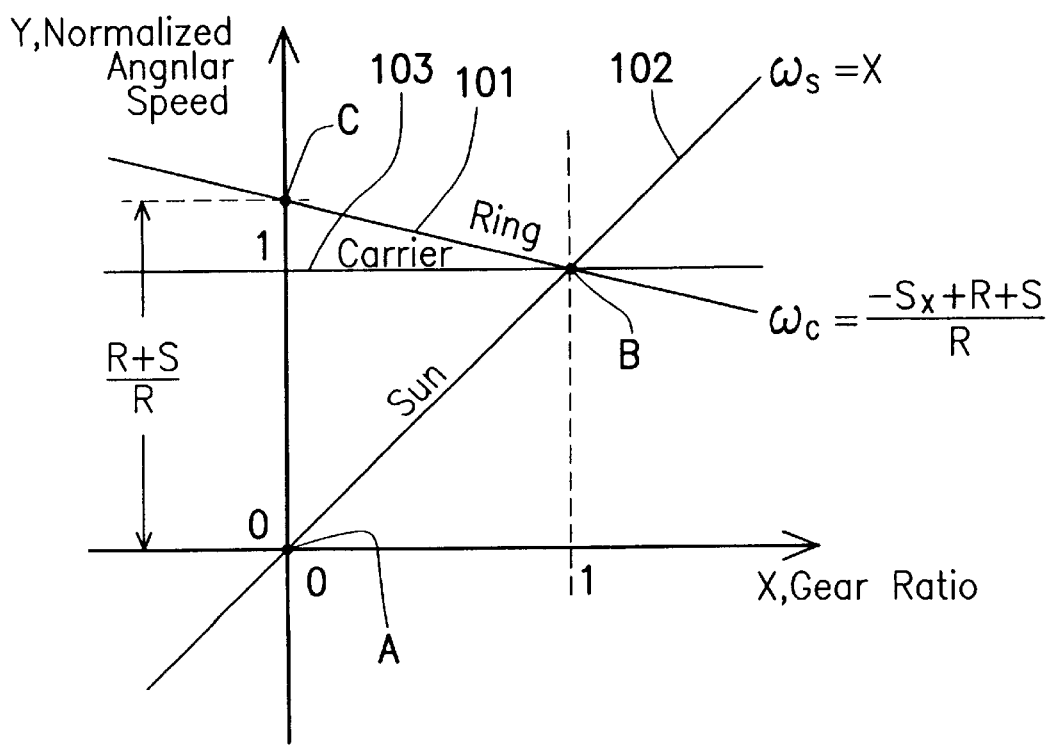
FIGS. 8, 9 and 10 respectively illustrate the angular speed relationships of the gear elements in a standard planetary, all-spur planetary and differential gear trains when utilized as a transmission interaction redistributing mechanism for constructing another arrangement of the mechanical implementation of the power transmission apparatus of FIG. 1.
Figure 9:
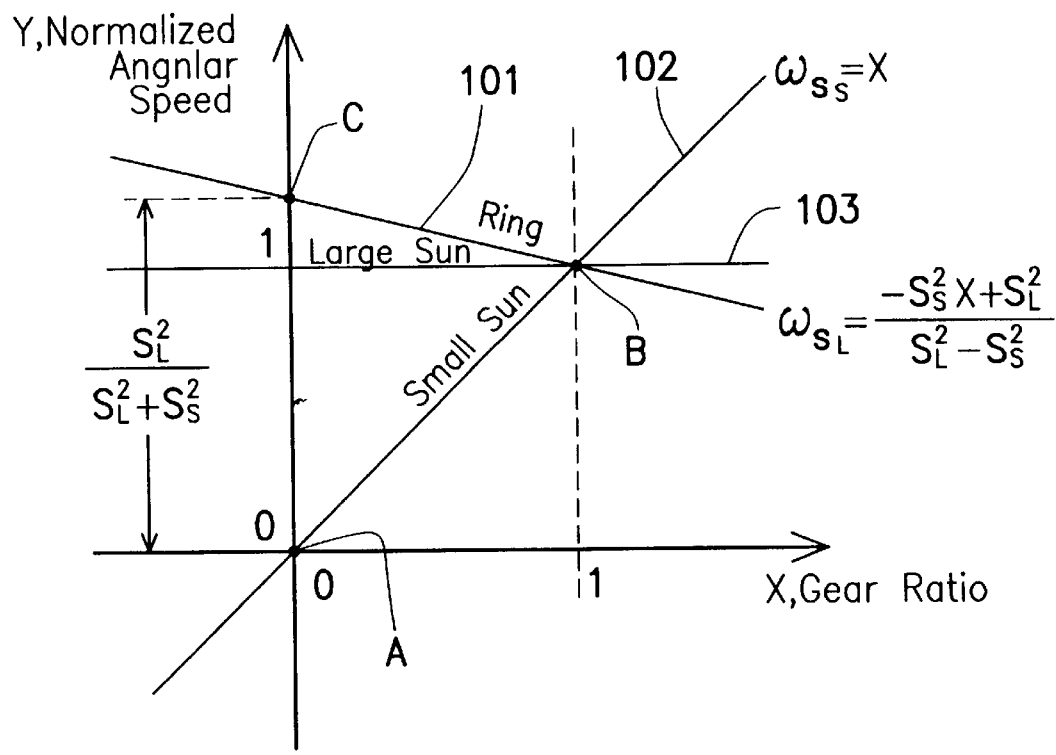
Figure 10:
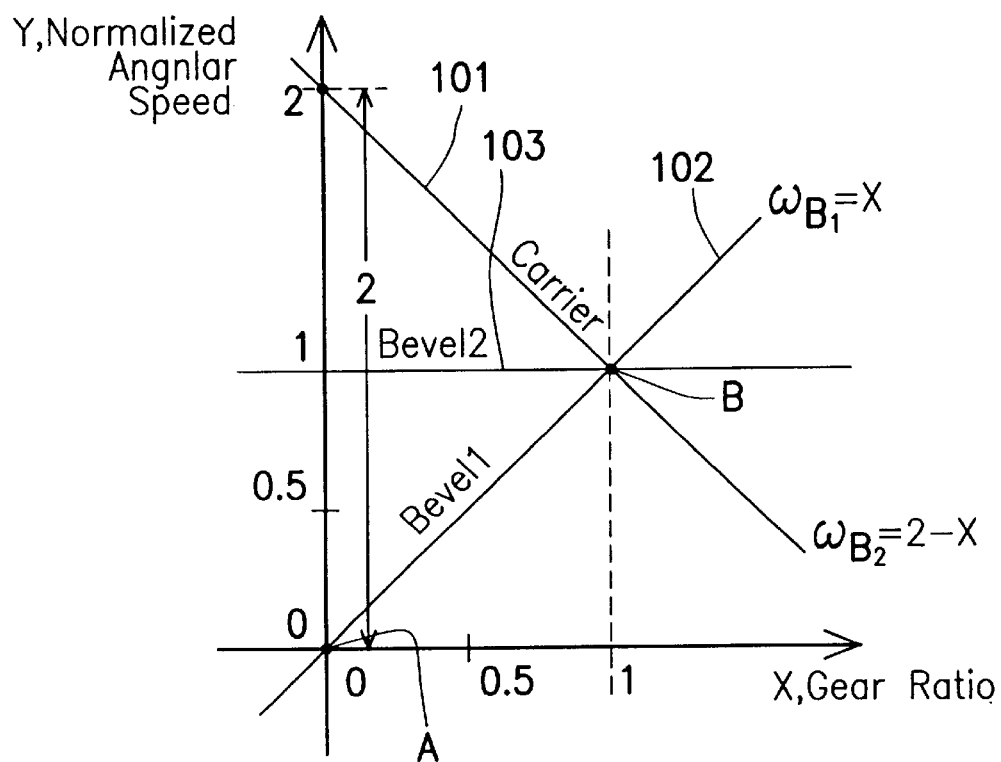

FIGS. 5, 6 and 7 respectively illustrate the angular speed relationships of the gear elements in the standard planetary, all-spur planetary and differential gear trains when each of the gear trains is utilized as a transmission interaction redistributing mechanism for constructing a mechanical implementation of the power transmission apparatus of the invention. In FIGS. 5, 6 and 7, the axis of abscissae represents the output-to-input gear ratio of the power transmission apparatus, and the axis of ordinates represents the normalized angular speed of the gears in the gear trains.

The speed relationships of the gear elements in the gear trains of FIGS. 5, 6 and 7 may be expressed as the motion equations of the epicyclic gear trains which may be derived from the gear sizes and the topological configurations of the respective gear trains. For example, in the case of a standard planetary gear train of FIG. 5, assuming the ring gear has a radius R and the sun gear a radius S. If the ring gear angular speed is maintained at the normalized unity speed as illustrated by the input speed line 101 in FIG. 5 and the sun gear is allowed to vary its speed linearly against the x-axis along the output speed line 102 from gear ratio zero at point A to unity at point B, then the angular speed of the sun gear in the y-axis is simply $\omega_S = x$, where the variable x represents the gear ratio. In this case, the angular speed of the carrier gear $\omega_C$=represented by the speed line 103 may be determined by the equation $\omega_C = (Sx+R)/(R+S)$. When the sun gear is at stall speed of point A, the speed of the carrier gear at point C is $R/(R+S)$. At the opposite end, when the sun gear is brought up to the speed of the ring gear at point B, the carrier gear rotates at the same speed as the ring and sun gears. In fact, the three gears rotate at the same angular speed at the unity gear ratio of point B.

For the other two types of epicyclic gear trains, there exists similar speed relationships. For example, for the all-spur planetary gear train of FIG. 6, assuming the large sun gear has a radius $S_L$ and the small sun gear a radius of $S_S$. If the carrier gear angular speed is maintained at the normalized unity speed on the input speed line 101 while the small sun gear varies its speed linearly against the x-axis along output speed line 102 from gear ratio zero of point A to unity of point B, then the angular speed of the small sun gear in the y-axis is simply $\omega_{S_S} = x$. The angular speed of the large sun gear may be determined by the equation $\omega_{S_L} = (S_S^2 X + S_L^2 - S_S^2)/S_L^2$ as represented by the speed line 103. When the sun gear is at stall speed on point A, the speed of the large sun gear on point C is $(S_L^2 - S_S^2)/S_L^2$.

For the differential gear train with both bevel gears symmetrically the same size as characterized in FIG. 7, if the angular speed of one of the bevel gears is maintained at the normalized unity speed on the input speed line 101, while the other bevel gear is allowed to vary from gear ratio zero on point A to unity on point B along output speed line 102, then the angular speed of this output bevel gear in the y-axis is simply $\omega_{B_1} = x$. The angular speed of the carrier gear $w_C$ may be determined by the equation $\omega_C = (x+1)/2$ along the speed line 103. When the output bevel gear is at stall speed on point A, the speed of the carrier gear is half that of the first bevel gear on point C.

Figure 11:
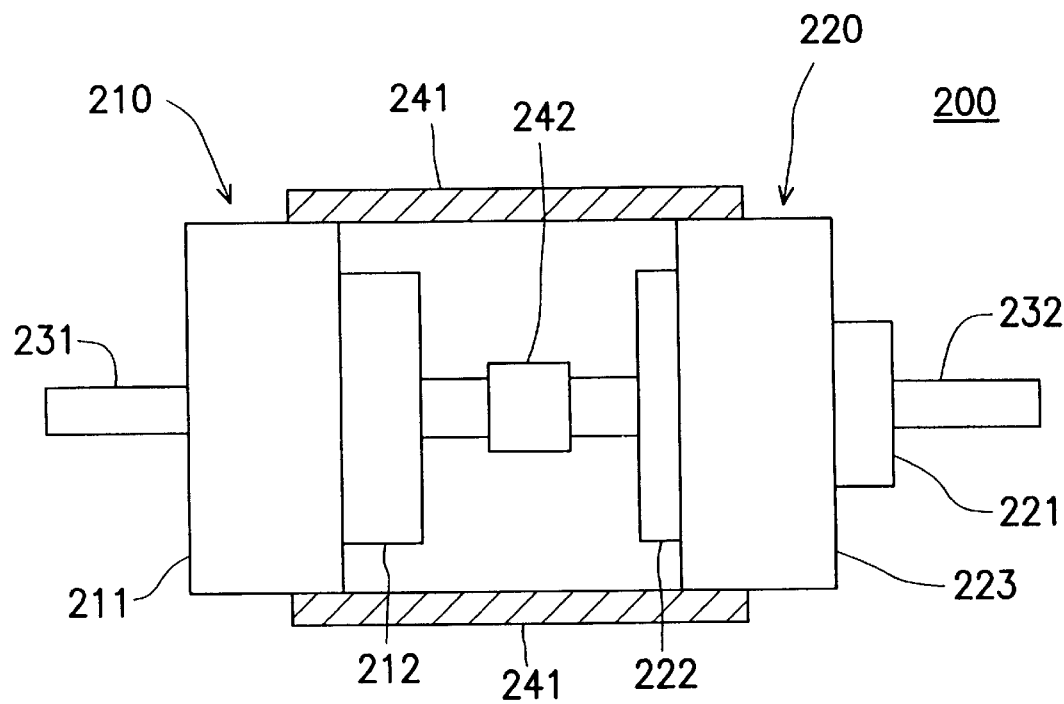
FIG. 11 outlines the structural configuration of a generalized mechanical implementation of the power transmission apparatus of the invention.

FIG. 11 illustrates a generalized mechanical implementation of the power transmission apparatus of the invention in an elevational view. The apparatus 200 is comprised of a mechanical power-transmitting means 210 and an epicyclic gear train 220 that is utilized as the mechanical transmission interaction redistributing means. Note that FIG. 11 does not show the structural details of the integration between the elements of the power-transmitting means 210 and the gear elements of the epicyclic gear train 220. Rather, the integration is illustrated schematically only to show the interrelationship between elements of the two constituent means 210 and 220. Details of structural integration are dependent on the configurational dimensions of the elements of both means 210 and 220 and are readily comprehensible when specific integration requirements between the two are outlined.

In general, the mechanical power-transmitting means 210 is comprised of at least two transmission interaction elements 211 and 212. One of the two elements is the driving element that operates at a driving angular speed and transmits the mechanical power to the other, which is the driven element that operates at a driven angular speed. The interaction between the driving and the driven elements 211 and 212 facilitates the power transmission of the mechanical power-transmitting means 210.

The mechanical power transmitted internal to the mechanical power-transmitting means 210 is received from an external mechanical power source via an input rotary shaft 231 of the apparatus. The mechanical power-transmitting means 210 is integrated with the mechanical transmission interaction redistributing means 220 to make up the mechanical power transmission apparatus. The mechanical power received by the mechanical power-transmitting means 210 from the external mechanical power source is then redistributed by the mechanical transmission interaction redistributing means 220 onto an output rotary shaft 232 of the apparatus and delivered to an external mechanical load.

The mechanical transmission interaction redistribution means 220 is an epicyclic gear train comprising a first gear 221, a second gear 222 and a third gear 223. The second gear 222 of the epicyclic gear train rotates in the same rotational direction as the third gear 223 and at an angular speed slower than the third gear when the third gear is driven with the first gear 221 held stationary. This angular speed relationship between the gear elements of the epicyclic gear train 220 is illustrated in all the angular speed/gear ratio diagrams of FIGS. 5–7 and 8–10, which demonstrate the relationship for different gear trains with different input arrangements. The gear ratio range between points A and B in each of drawings of FIGS. 5–7 and 8–10 satisfies this requirement if angular speed of the first, the second and the third gear follow speed line 102, 103 and 101 respectively.

To integrate the mechanical power-transmitting means 210 and the epicyclic gear train 220 together in order to construct a mechanical implementation of the power transmission apparatus of the invention, the third gear 223 of the epicyclic gear train is connected to the driving element 211 of the mechanical power-transmitting means, the second gear 222 is connected to the driven element 212 of the mechanical power-transmitting means, and the first gear 221 is connected to the output rotary shaft 232 of the apparatus.

In the drawing of FIG. 11, the driven element 212 of the power-transmitting means 210 is connected to the second, the carrier gear 222, of the epicyclic gear train 220 by a coupling means 242. On the other hand, the driving element 211 is connected to the third, the ring gear 223, of the gear train 220 by a coupling means 241. Since the structure of both the power-transmitting means 210 and the epicyclic gear train 220 are symmetrical with respect to the longitudinal axis of the apparatus along the axial center line of the input and output rotary shafts 231 and 232, these two direct coupling means 241 and 242 may likewise be made axially symmetrical. However, other than the direct coupling as illustrated in the drawing, other coupling means such as gearing or belt traction are also allowed as will be described in detail in the following paragraphs.

The power-transmitting interaction of the driving element 211 and driven element 212 of the mechanical power-transmitting means 210 operating at the driving and the driven angular speeds respectively is redistributed onto the output rotary shaft 232 by the epicyclic gear train 220, and the output rotary shaft 232 delivers the mechanical power to the external mechanical load at an output angular speed.

As described above, the standard planetary, all-spur planetary and differential gear trains are considered to be epicyclic gear trains so long as they are utilized as the mechanical transmission interaction redistributing means. Thus, the epicyclic gear train 220 in the embodiment of the mechanical implementation of the apparatus of FIG. 11 can either be the standard planetary, the all-spur planetary, or the differential gear train.

Due to the topological characteristics of the various types of epicyclic gear trains applicable for constructing the mechanical implementation of the apparatus of the invention, the integration of the elements of the redistributing means with that of the power-transmitting means can be implemented in different configurational arrangements. However, all these varied arrangements of integration of the two must comply with the principle of the invention, although the performance characteristics of the apparatus would be altered slightly. Though, note that all the applicable integration arrangements must satisfy the condition for speed relationship among the gear elements of the gear train as described above. Specifically, in the gear train used as the interaction redistributing means for the apparatus, the second gear rotates in the same rotational direction as the third gear and at an angular speed slower than the third gear when the third gear is driven with the first gear held stationary.

Thus, a standard planetary gear train used as the transmission interaction redistributing means comprises a sun gear, a carrier gear carrying a suitable number of pinion gears and a ring gear. In one arrangement of the mechanical implementation of the power transmission apparatus of the invention as illustrated in FIG. 11, the first gear 221 of the standard planetary gear train that serves as the output shaft 232 of the power transmission apparatus is the sun gear. The second gear 222 that is connected to the driven element 212 of the power-transmitting means 210 is the carrier gear, and the third gear 223 connected to the driving element 211 is the ring gear. In an alternative arrangement, the first gear 221 that serves as the output 232 of the apparatus of the invention is the ring gear. The second gear 222 that is connected to the driven element 212 of the power-transmitting means 210 is the carrier gear, and the third gear 223 connected to the driving element 211 is the sun gear.

Similarly, in the case of an all-spur planetary gear train, in one arrangement, the first gear 221 of the gear train 220 that serves as the output shaft 232 of the apparatus of the invention is the small sun gear. The second gear 222 that is connected to the driven element 212 of the power-transmitting means 210 is the large sun gear, and the third gear 223 connected to the driving element 211 is the carrier gear. In an alternative arrangement, the first gear 221 that serves as the output 232 of the apparatus of the invention is the carrier gear. The second gear 222 that is connected to the driven element 212 of the power-transmitting means 210 is the large sun gear, and the third gear 223 connected to the driving element 211 is the small sun gear.

When a differential gear train is used as the interaction redistributing means 220 in FIG. 11, it is comprised of a pair of bevel gears and a carrier gear carrying a suitable number of pinion gears. In the case of a symmetrical differential gear train, i.e., the sizes of the two bevels are the same, there is only one effective integration arrangement. The first gear 221 of the differential gear train 220 that serves as the output 232 of the apparatus of the invention is one of the two bevel gears. The second gear 222 that is connected to the driven element 212 of the power-transmitting means 210 is the carrier gear, and the third gear 223 connected to the driving element 211 is the other of the two bevel gears.

When apparatus performance characteristics is concerned, the substantial difference between the two integration arrangements for each of the three types of epicyclic gear trains described above rests on the dimensional configuration of the gears in the respective gear train. In other words, the relative sizes of the ring and sun gears of the standard planetary and the small and large sun gears of the all-spur planetary gear trains respectively determine the performance characteristics of the power transmission apparatus constructed.

Figure 12:
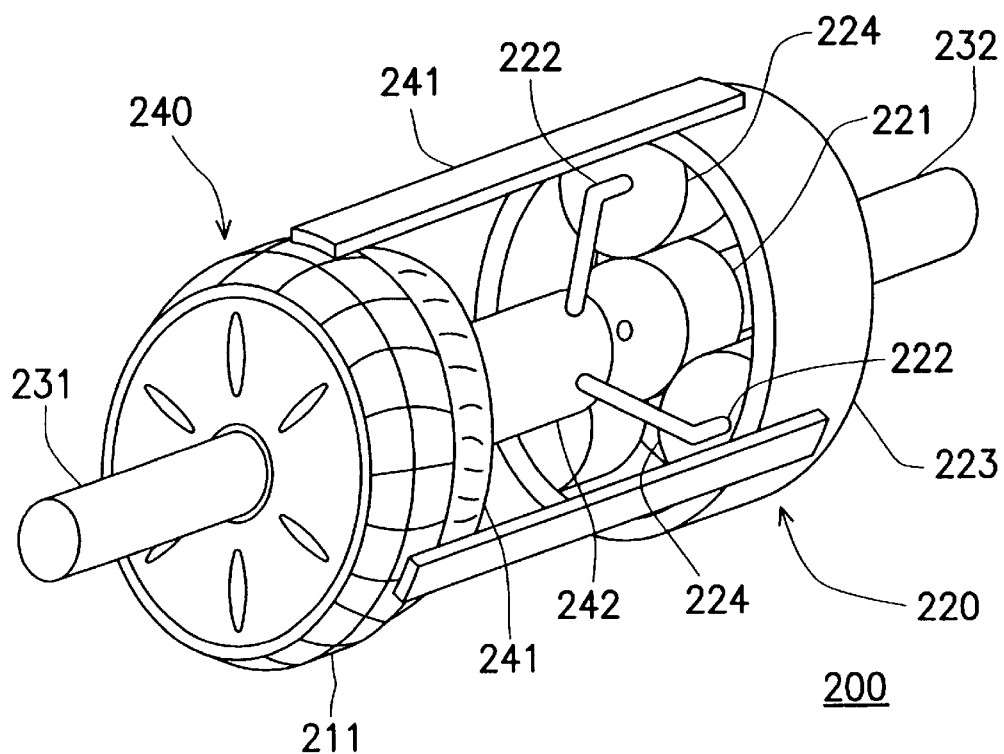
FIG. 12 illustrates in a perspective view an embodiment of a mechanical implementation of the power transmission apparatus of FIG. 11 adopting a coaxial configuration.
Figure 13:
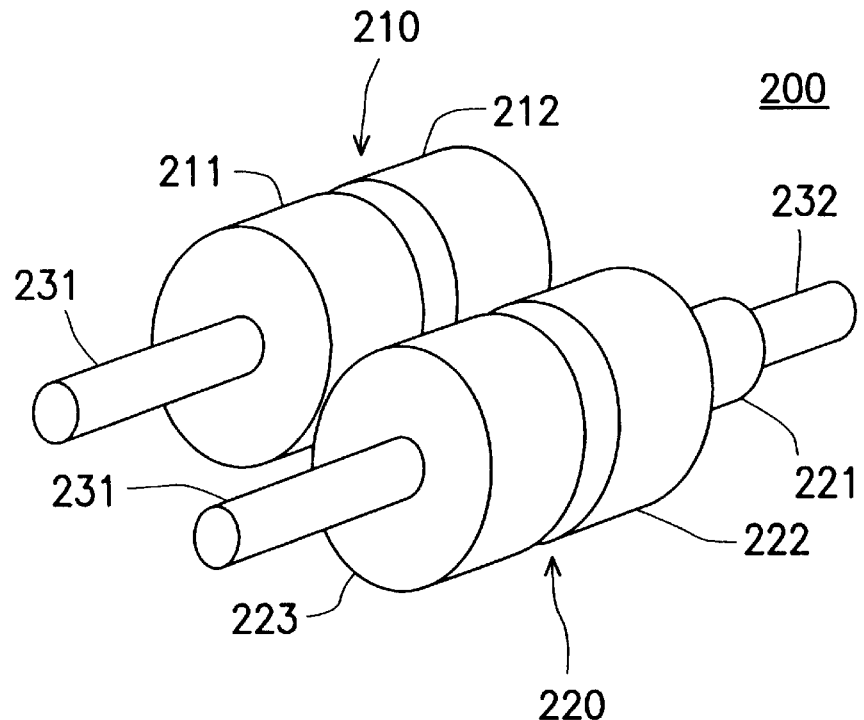
FIG. 13 illustrates another embodiment of the mechanical implementation of the power transmission apparatus of FIG. 11 adopting a parallel-axis configuration.

When constructing a mechanical implementation of the power transmission apparatus of the invention as generally outlined in FIG. 11, the structural integration of the power-transmitting means 210 and the transmission interaction redistributing means 220 can be either directly coaxial or offset at parallel axes. For the coaxial arrangement, the input and output shafts 231 and 232 of the apparatus can be aligned on the same axis, and the entire apparatus can be constructed in a relatively compact package. On the other hand, the parallel-axis arrangement is suitable for those power-transmitting devices such as variable-pitch cone-pulley drives having noncoaxial input and output shafts. Parallel-axis arrangement is also suitable for those apparatus of the invention requiring special final gear ratio adjustments, as will be described in the following paragraphs. FIGS. 12 and 13 respectively depict the coaxial and parallel-axis structural arrangements respectively.

FIG. 12 illustrates an embodiment of a mechanical implementation of the power transmission apparatus of FIG. 11 that adopts the coaxial configuration. In the perspective view of the depicted apparatus, a power-transmission device 210 such as a fluid coupler and a standard planetary gear train 220 are utilized as the power-transmitting means and the transmission interaction redistributing means respectively. Note that the drawing does not show details of the gear teeth of the gear elements, nor does it show the various bearings used to support the elements in place and provide for adequate lubricated rotation. On the spatial relationship between the elements of device 210 and gear train 220 is demonstrated.

In this coaxial arrangement, the central axes of symmetry of both means 210 and 220 coincide with each other, and are further aligned with the input shaft 231 and the output shaft 232 of the apparatus. The driving element, the impeller 211, of the fluid coupler 210 is directly fixed to the ring gear 223 of the gear train 220 via a coupling framework 241. The driven element, the turbine 212, is directly fixed to the carrier 222 of the gear train 220 that holds pinion gears 224 in position. The carrier 222 is fixed to the driven element 212 via a coupling shaft 242. The carrier 222 is not made in the form of a gear as there is no such requirement for it to be engaged with any other gear in this described example. Thus, in this coaxial arrangement, the impeller 211 of the fluid coupler 210 rotates in synchronous with the ring gear 223 of the planetary gear train 220, and the turbine 212 synchronous with the carrier 222.

FIG. 13 illustrates another embodiment of the generalized mechanical implementation of the power transmission of FIG. 11 adopting the parallel-axis configurational arrangement. The mechanical implementation of FIG. 13 utilizes the same power-transmitting means and the transmission interaction redistributing means as those of the apparatus of FIG. 12. In the perspective view, again, gearing teeth and support bearings are not detailed. In this parallel-axis arrangement, the impeller 211 and the turbine 212 of the fluid coupler 210 may be coupled to the ring gear 223 and the carrier gear 222 of the planetary gear train 220 via suitable mechanical couplings respectively. Though not shown in the drawing, the mechanical couplings may, for example, be via gear teeth formed on the circumferential surface of the respective elements so that adequate gear meshing can be made between the two coupled pairs. If the spatial conditions require, an idler gear of suitable size can be arranged between each of the coupled pairs. Or alternatively, belt drives can be used to provide the necessary mechanical coupling for the two pairs.

Figure 14:
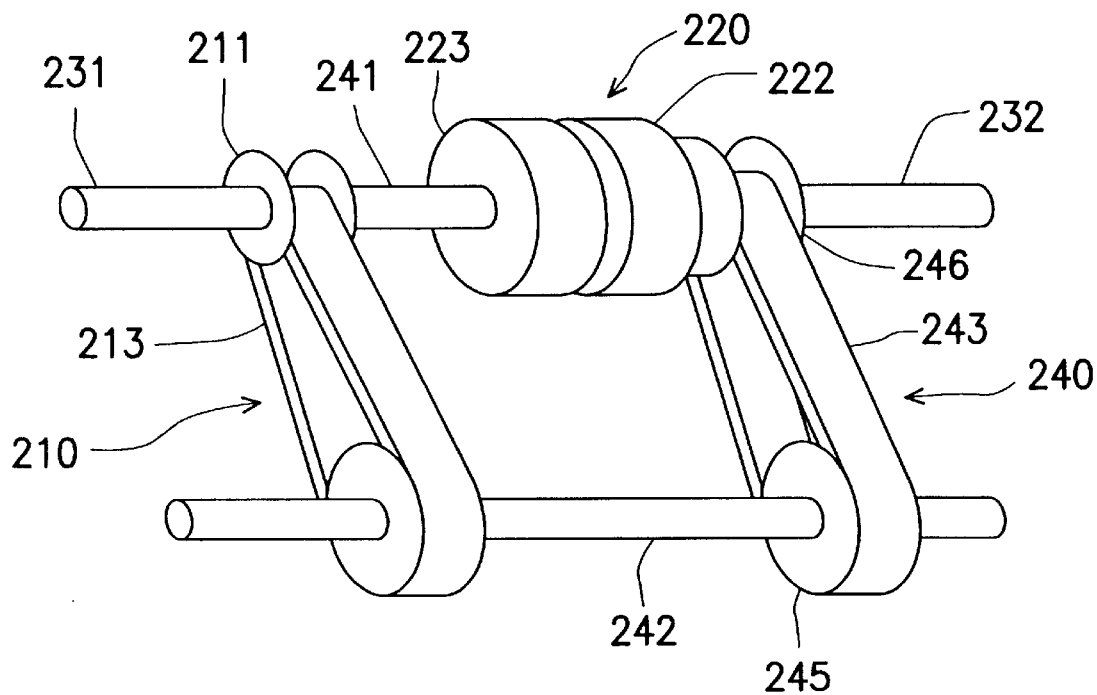
FIG. 14 is a perspective view of an embodiment of the mechanical implementation of the power transmission apparatus of FIG. 11 in which a variable-pitch cone-pulley drive is utilized as the power-transmitting device.

FIG. 14 is a perspective view of another embodiment of the mechanical implementation of the power transmission apparatus of FIG. 11 in which a variable-pitch cone-pulley drive 210 operating on a traction belt 213 is utilized as the power-transmitting means. Due to the spatial configuration of such a belt drive, the driven element of the power-transmitting means, i.e. the driven pulley 212, must be installed on a shaft 242 parallel and offset to the shaft 241 of the driving element, i.e., the driving pulley 211. The driving pulley 211 is coupled directly to the ring gear 223 of the planetary gear train 220 via the shaft 241. The driven pulley 212 is coupled to the carrier gear 222 of the planetary 220 via another belt drive 240 utilizing a belt 243. For simplicity, this second belt drive 240 may be a fixed-pitch one employing pulleys 245 and 246. Pulley 246 is directly connected to the carrier gear 222 of the gear train 220. Instead of this second belt drive 240, an idler gear may be used to provide the equivalent mechanical coupling in an alternative arrangement. Note that the mechanism responsible for varying the pitch of the driving pulley 211 and/or driven pulley 212 are not shown in the drawing.

In the embodiment of either FIG. 12, 13 or 14, adequate housing to the apparatus depending on the particular application can be provided to protect the entire power transmission system. Further, the epicyclic gear train used as the interaction redistributing mechanism may need an enclosing housing to maintain proper lubrication for its gears.

Figure 15:
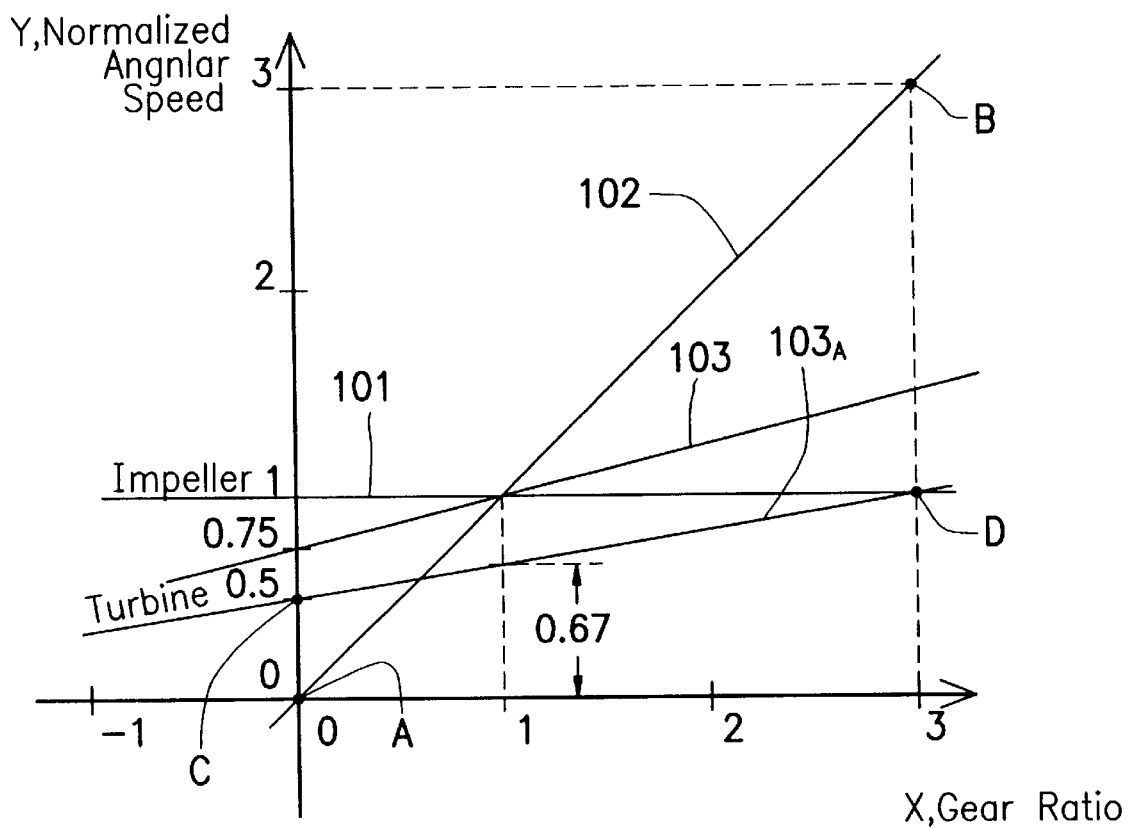
FIG. 15 illustrates the angular speed/gear ratio diagram for a parallel-axis arrangement of the mechanical implementation of FIG. 13 having different gearing ratios for the two couplings integrating the power-transmitting means and the interaction redistributing means.

In the non-coaxial, i.e. the parallel-axis configuration of FIG. 13, when gearing is utilized to provide the two necessary mechanical coupling between the elements of the power-transmitting device 210 and that of the transmission interaction redistributing mechanism 220, each of the gear ratios for both coupled pairs need not be unity, and the two gear ratios need not be the same. This also applies to the parallel-axis arrangement such as is in the case of FIG. 14 in which belt coupling is used. In belt couplings, the pitch ratios of the two pulleys are treated as gear ratios herein. The difference between the gear ratios for the two couplings can be employed as a factor for adjusting the final gearing ratio of the power transmission apparatus of the invention. FIG. 15 illustrates the angular speed/gear ratio diagram for such an arrangement. For example, in the parallel-axis arrangement of FIG. 13, in which a fluid coupler or torque converter is utilized as the power-transmitting means 210, the driven element 212 of the power-transmitting means 210 is coupled to the second gear 222 of the epicyclic gear train 220 at a gear ratio smaller than that of the coupling between the driving element 211 and the third gear 223.

In the case of the parallel-axis apparatus of FIG. 13 depicting the configurational arrangement of FIG. 15, assume that the fluid coupler impeller 211 is coupled to the ring gear 223 of the planetary gear train 220 at a unity gear ratio along input speed line 101 in order that both rotates at the same angular speed. Meanwhile, the turbine 212 is coupled to the carrier gear 222 at a gear ratio of 3/2 so that the turbine angular speed is two-thirds that of the carrier gear 222. It is further assumed that the planetary gear train 220 has a ring-to-sun gear ratio of 3/1. This arrangement permits the output shaft 232 of the power transmission apparatus at the sun gear 221 of the planetary 220 to reach to an angular speed equivalent to a final gear ratio of nearly three along the output speed line 102. This means, as the power-transmitting fluid coupler 210 operates in an accelerating process from an equivalent gearing ratio of 50 percent at point C to nearly 100 percent at point D along the speed line $103_A$ which is ⅔gear-reduced with respect to speed line 103, the output shaft 232 of the apparatus operates in a corresponding speed range of zero at point A to three times the speed of the input shaft 231 at point B along the output speed line 102. This is equivalent to a final gear ratio of three for the power transmission apparatus.

Figure 16:
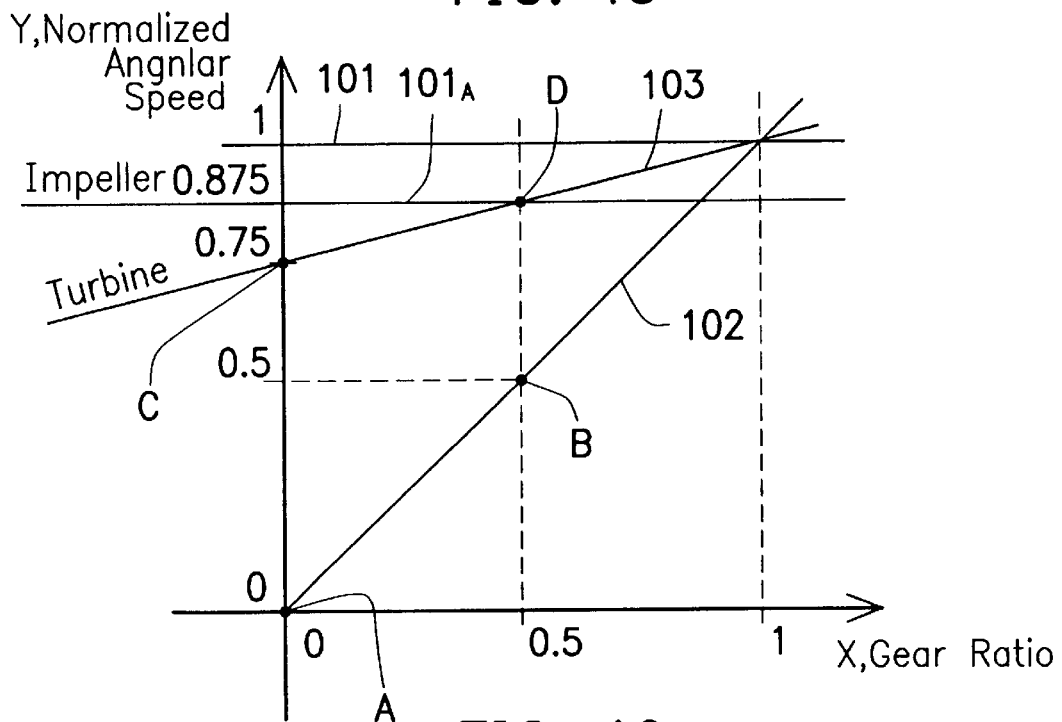
FIG. 16 illustrates the angular speed/gear ratio diagram for another parallel-axis arrangement of the mechanical implementation of FIG. 13 having different gear ratios for the two couplings integrating the power-transmitting means and the interaction redistributing means.

In contrast to the configurational arrangement of FIG. 15, consider the situation of the apparatus of FIG. 13 as depicted in FIG. 16. Let the fluid coupler turbine 212 be coupled to the carrier gear 222 of the planetary 220 at a unity gear ratio in order that both rotates at the same angular speed. On the other hand, the impeller 211 is coupled to the ring gear 223 at a gear ratio of 8/7 so that the impeller angular speed is seven-eighths (0.875) that of the ring gear 223 along the speed line $101_A$, which is ⅞ gear-reduced with respect to that of the input speed line 101. Again, assume that the planetary gear train 220 has a ring-to-sun gear ratio of 3/1. This system may allow the output shaft 232 of the apparatus at the sun gear 221 to reach to an angular speed equivalent to a final gear ratio of only nearly 0.5. Thus, as the fluid coupler 210 speeds up from the equivalent gear ratio of 85.7 percent (0.75/0.875) at point C to nearly 100 percent at point D along the speed line 103, the output shaft 232 of the apparatus operates in a corresponding speed range of zero at point A to one half the speed of the input shaft 231 at point B along the output speed line 102, an equivalent final gear ratio of 0.5 for the power transmission apparatus.

Thus, the configurational arrangements of employing different coupling gear ratio for the elements of the power-transmitting and the interaction redistributing means as described in FIGS. 15 and 16 respectively are functionally equivalent to the use of a final gear adjustment stage for the apparatus of the invention that employs the coaxial arrangement. Though the parallel-axis arrangement is relatively more complex in structure than the coaxial, it enjoys the advantage of easy final gear ratio adjustment without the need for an additional gearing stage if the application of the apparatus has its output speed range not compatible to that of the input.

For a mechanical implementation of the power transmission apparatus of the invention constructed out of the integration of a power-transmitting device and an epicyclic gear train, note that either the driving or the driven element of the power-transmitting device may serve as the input of the apparatus to receive mechanical motive power from the external power source. The difference between the use of either the driving or the driven element of the mechanical power-transmitting device as the apparatus input is the slight mutual deviation between the apparatus performance characteristics in both cases. This becomes obvious if the angular speed relationships of gear elements of the epicyclic gear trains as illustrated in FIGS. 5, 6 and 7 are compared with those shown in FIGS. 8, 9 and 10 respectively. The slight difference is a result of the sustaining of the comparison basis that the input shaft be kept at constant angular speed.

In the cases of FIGS. 5, 6 and 7 respectively representing the use of the standard planetary, the all-spur planetary and the differential gear train as the power transmission interaction redistributing mechanism, the third gear of each of the epicyclic gear trains is connected to the driving element of the power-transmitting device. Thus the third gear of each of the epicyclic gear trains serves as the input of the apparatus for receiving the external mechanical motive power, as is represented by the input speed line 101 in FIGS. 5, 6 and 7. In contrast, for the cases of FIGS. 8, 9 and 10 respectively, it is the second gear of each of the epicyclic gear train which is connected to the driven element of the power-transmitting device that serves as the input of the apparatus, as is represented by the input speed line 103. A comparison of each of the three types of epicyclic gear trains reveals the fact that the power-transmitting device operates under different driving and driven element angular speeds in each of its two configurational arrangements such that the apparatus performance characteristics become shifted.

Note that when referring to the first, the second and the third gears of the epicyclic gear trains, there must be the satisfied condition that the second gear of the epicyclic gear train rotates in the same rotational direction as the third gear and at an angular speed slower than the third gear when the third gear is driven with the first gear held stationary. The six configurational arrangements for the generalized mechanical implementation of the apparatus of FIG. 11 as depicted in FIGS. 5–7 and FIGS. 8–10 are two groups of arrangement for the three types of epicyclic gear trains complying to this speed relationship requirement. There are another two groups of arrangement for the three types of epicyclic gear trains also complying to the very speed relationship requirement.

The first group is correspondent to the arrangement of FIGS. 5–7 and may be obtained by swapping the gear elements represented by speed lines 101 and 102 in each of the three arrangements. The second group is correspondent to the arrangement of FIGS. 8–10 and may also be obtained by swapping the gear elements represented by speed lines 101 and 102 in each of the three arrangements. For example, the ring gear represented by speed line 101 and the sun gear represented by speed line 102 of both FIG. 5 and 8 may be swapped so that speed line 101 becomes representing the sun gear and speed line 102 the ring gear. In each of the swapped arrangements, the speed equation for the gear represented by speed line 103 is also altered accordingly by shifting its point C on the axis of ordinates.

Consider the mechanical implementation of the power transmission apparatus outlined in FIG. 12 again. Assuming again that the power-transmitting device 210 is a fluid coupler and the transmission interaction redistributing mechanism 220 a planetary gear train. The angular speed relationships among the various rotary elements of this apparatus can be described in the diagram of FIG. 5. In its structural integration arrangement, the driving element, impeller 211, of the fluid coupler 210 is connected to the ring gear 223, and the driven, turbine 212, to the carrier gear 222. Sun gear 221 of the gear train 220 functions as the output shaft 232 of the power transmission apparatus. Mechanical input from the external power source can be applied to either the driving 211 or the driven element 212 or, either the ring 223 or the carrier gear 222 respectively. In other words, either the driving or the driven element of the power-transmitting device can serve as the input of the power transmission apparatus.

From the angular speed/gear ratio relationship of FIG. 5, it is clear that when the ring gear 223 is maintained at unity angular speed, for the sun gear 221 (i.e., the output 232 of the power transmission apparatus) to operate in a speed range of zero to unity gear ratio, the carrier gear 222 needs only to vary its angular speed from R/(R+S) to unity gear ratio. In a typical planetary gear train with the sun gear having a radius one-third that of the ring gear, this is a range from 75 (i.e., 3/(3+1)) to 100 percent of the ring gear speed.

In other words, as the driving element 211 of the power-transmitting device 210 is driving at unity angular speed, the driven element 212 only needs to operate from 75 to 100% the speed of the driving element 211 so that the output 232 of the apparatus can deliver a full speed range of zero to 100 percent of the input angular speed received at the apparatus input 231. In a sense, the 75-to-100 percent speed range—not including the stall speed—of the power-transmitting device 210, a fluid coupler, is redistributed, or remapped for that matter, to the full speed range of the apparatus—including the stall speed.

For apparatuses of the invention employing power-transmitting devices whose driven element can not outrun the driving element in speed when transmitting power, normally the apparatus can only operate within the gear ratio range between zero and unity to transmit mechanical power from its input to output shaft. This assumes that the couplings between the driving and driven element of the power-transmitting device and their corresponding gear elements in the epicyclic gear train are at the same gear ratio. This is because, in these power-transmitting devices, mechanical motive power is only transmitted from the element operating at greater speed to the other at slower speed.

Within this gear ratio range, the configurational arrangement for the apparatus is capable of receiving mechanical power at its input shaft—either the driving element of the power-transmitting device or the driven element, and delivering mechanical power at its output shaft, thereby facilitating the transmission of mechanical power. In the gear ratio range from zero to unity, the entire power transmission apparatus has a natural tendency of accelerating its mechanically loaded output shaft from stall to unity gear ratio speed. This happens as the input shaft is receiving mechanical power from the external power source and allowing the driving element of the power-transmitting device, the impeller of a fluid coupler for example, to bring up the speed of the driven element, turbine, together with its load. The tendency is toward the direction in the diagram of FIG. 5 with less slip between the driving and driven elements of the power-transmitting device. Specifically, this is the direction from point A to B along the output speed line 102 in FIG. 5.

In those apparatuses of the invention employing other power-transmitting devices such as the variable-pitch cone-pulley drive, the equivalent gear ratio range of the apparatus is not limited to the range of from zero to unity gear ratio. Gear ratio of the power-transmitting device itself, among others, constitutes one of the parameters for determining the effective gear ratio of the power transmission apparatus. If the power-transmitting device does provide a gear ratio in which its driving element is operating at an angular speed slower than the driven element, then the equivalent gear ratio of the apparatus can then exceed unity, as is clearly shown in the diagrams depicted in FIGS. 5–7 and 8–10.

In fact, in the power-transmitting device such as a fluid coupler whose two interaction elements are substantially symmetrical, the one that is driving at a faster angular speed is referred to as the impeller, and the other that is driven at the slower speed is referred to as the turbine. There are occasions in which the situation is reversed, in which the impeller becomes the turbine and the turbine becomes the impeller by definition simply because the speed relationship is reversed. This permits the reversed direction of power flow as compared to that when the apparatus is operating in the normal direction of power flow.

For example, consider again the apparatus of FIG. 12 with a fluid coupler used as the power-transmitting device 210 and a planetary gear train as the transmission interaction redistributing mechanism 220. And again, one hydraulic blade element 211 of the fluid coupler 210 is connected to the ring gear 223, and the other 212 to the carrier gear 222. When the external mechanical power source is input to the apparatus at, for example, the element 211 of the fluid coupler that is connected to the ring gear 223, the apparatus transmits mechanical power to the output shaft 232 at the sun gear 221.

Assume that the power source, an internal combustion engine for example, driving the apparatus input 231 along the input speed line 101 has brought the angular speed of the output shaft 232 up to a point E along the output speed line 102 at the high-speed end of FIG. 5 within the gear ratio range from zero to unity. Further assume that the power source then reduces its angular speed to a level of reduced engine speed line 101$_R$ on the y-axis below the angular speed level of the current speed of the sun gear 221 on point E. In this case, the output speed point E in the original coordinate system of FIG. 5 representing the original status of the apparatus becomes a point beyond the unity gear ratio in a reduced-scale coordinate system, whose unity gear ratio is identified by the point B$_R$ along the common output speed line 102.

Under such situation, angular speed of the ring gear 223 connecting to the blade element 211 that was originally the driving impeller element has come down to the point F on the reduced engine speed line 101$_R$. Angular speed of the blade element 211 at this point F is slower than the corresponding angular speed at point G along the reduced carrier speed line 103$_R$ of the carrier gear 222 connecting to the blade element 212 that was originally the driven turbine element. In this case, the roles of the two hydraulic blades 211 and 212 in the fluid coupler 210 are exchanged. The one blade 211 that was originally the impeller now becomes the turbine since it is now driven at the slower speed by the other blade 212 that was originally the turbine, which now becomes the impeller as it is driving the other at a faster angular speed. Thus, the mechanical power flows in the reversed direction, with the sun gear 221 of the planetary 220 being the input, and the ring gear 223 becomes the output. For applications such as in a vehicle drive train, this is a situation known as engine braking. With suitable energy-harnessing arrangements such as those found in hybrid and electric vehicles, this may provide the vehicle with the capability of regenerative braking.

Figure 17:
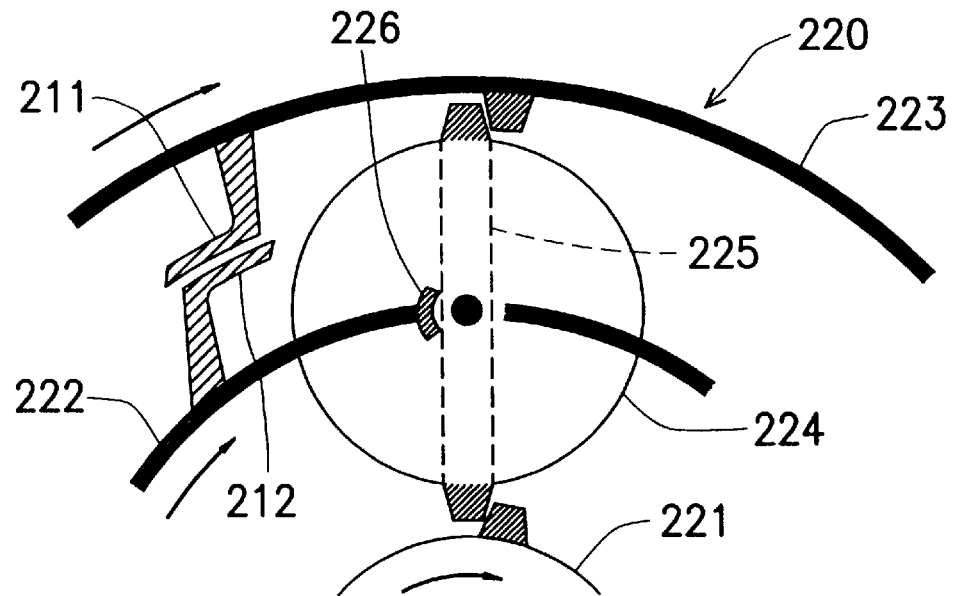
FIG. 17 schematically illustrates an equilibrium lever system in a planetary gear train, in which the power-transmitting device of the mechanical implementation of FIG. 13 receives the mechanical motive power for output via the sun gear.

Within the planetary gear train used as the transmission interaction redistributing mechanism, each of the pinion gears with its respective central axis pivoting on the suitable bearing arrangement of the carrier gear must establish a balanced lever system with the sun and ring gears gear-meshed at the opposite ends of the pivot center point. FIG. 17 schematically illustrates such an equilibrium lever system in a planetary gear train in which the power-transmitting device such as a fluid coupler is receiving the mechanical motive power for output via the sun gear of the apparatus.

As is shown in the drawing, an imaginary lever 225 identified by phantom line and formed of one of the pinion gears 224 is gear-meshed with the ring gear 223 and sun gear 221 at the opposite ends of the lever 225. Assuming that the external power source delivers the mechanical motive power to the apparatus via the driving element 211 fixed to the ring gear 223 of the planetary gear train 220 in the clockwise direction as observed in the drawing. The driven element 212 of the power-transmitting device that is fixed to the carrier gear 222 is driven to rotate also in the clockwise direction. The carrier gear 222 thus drives the imaginary lever 225, i.e., the entire pinion gear 224, to move in the clockwise direction. Since the pinion gear 224 is also rotating with respect to the framework of the carrier gear 222 when the entire system operates, a bearing schematically identified by the reference numeral 226 provides for the adequate lubricated rotational support.

The lever 225, with its outer end gear-meshed with the ring gear 223 to provide the counter force, permits the mechanical motive power received from the external power source by the power-transmitting device to be transmitted to the sun gear 221 via the gear-meshing at its inner end. Thus, the sun gear 221 is driven to rotate along the clockwise direction and delivers the received power to the external load of the apparatus.

With reference to the angular speed/gear ratio diagram of FIG. 5, it can be observed that in this balanced lever system of FIG. 17, the apparatus is thus capable of redistributing the mechanical power received at the angular speed of either the driving or the driven element of the power-transmitting device onto the output shaft at the angular speed of the sun gear. Phenomenally, the gear meshing point between the pinion gear 224 and the sun gear 221 travels over the circumferential surface of the sun gear 221 at the angular speed of the carrier gear 222 of the gear train, while the sun gear 221 itself is rotating at its own angular speed different from the carrier gear 222.

Figure 18:
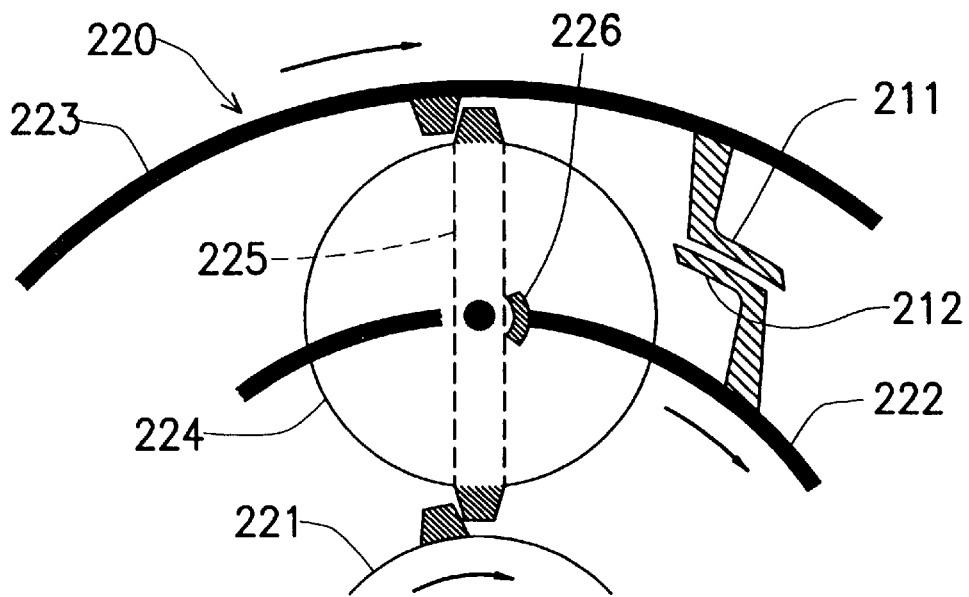
FIG. 18 schematically illustrates the equilibrium lever system in a planetary gear train, in which the power-transmitting device of the mechanical implementation of FIG. 13 is operated in the reversed direction of power flow as compared to the situation of FIG. 17.

FIG. 18 schematically outlines the balanced lever system in a planetary gear train in case that the power-transmitting device is operated in the reversed direction as compared to the situation of FIG. 17. For all-spur planetary and differential gear trains, similar situations exist as all these epicyclic gear trains are topologically equivalent when their structural configurations are concerned. Although planetary gear train is used to explain the lever balancing, the above reasoning is applicable to all types of epicyclic gear trains, including the planetary, all-spur planetary and differential gear train.

As a power-transmitting means to be incorporated in the construction of the mechanical implementation of the power transmission apparatus of the invention, there are various existing devices applicable. For example, in addition to the hydraulic power transmitting devices such as torque converter and fluid coupler already exemplified in the previous description paragraphs, other non-hydraulic devices can be incorporated with the epicyclic gear train to construct a mechanical implementation of the power transmission apparatus of the invention. Electromagnetic power-transmitting devices such as generator-motor set is among those suitable as it is also a power-transmitting system with a driving and a driven shaft.

Figure 19:
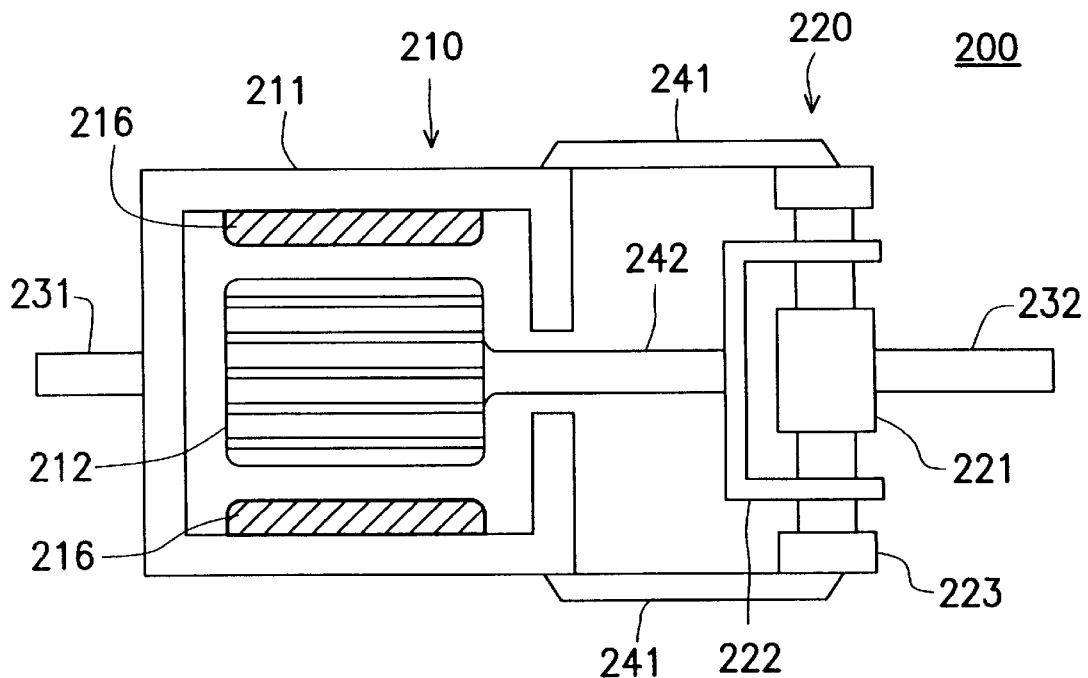
FIG. 19 illustrates a cross-sectional view of a mechanical implementation of the power transmission apparatus of the invention utilizing an induction machine as the power-transmitting device.

FIG. 19 schematically illustrates a cross-sectional view of a mechanical implementation of the power transmission apparatus of the invention in which an induction machine is utilized as the power-transmitting device. In FIG. 19, a particular type of induction machine 210 is preferable. This induction machine 210 has a field element 211 constructed out of a permanent magnet system that can interact with a squirrel cage element 212 similar in construction to those of a conventional induction motor. The permanent magnet system including at least a pair of permanent magnets 216 can be arranged as either the frame or the rotor element and, correspondingly, the squirrel cage element 212 can be either the rotor or the frame element.

The induction machine 210 in the apparatus 200 of FIG. 19 is integrated with the epicyclic gear train 220 in the manner described above to make up a mechanical implementation of the power transmission apparatus of the invention. Specifically, the driving permanent magnet field element 211 is connected to the ring gear 223 of the planetary gear train 220 by the coupling framework 241, and the driven squirrel cage element 212 is connected to the carrier gear 222 by the coupling shaft 242. Such a power transmission apparatus may be used as the transmission box of small internal combustion engine-driven vehicles if adequate power rating can be achieved utilizing permanent magnets with sufficient magnetic flux intensity.

Other power-transmitting devices such as eddy-current coupler and others based on the principle of electromagnetism are also applicable. All these power-transmitting devices are considered to be similar both in their general construction and functionality when they are incorporated into the power transmission apparatus of the invention as depicted in FIG. 11. They all possess a driving and a driven element for facilitating the transmission of mechanical power.

The Electromagnetic Implementation of the Apparatus

As a generalized power transmission apparatus capable of delivering good performance at the low-speed end of the full output operating speed range, there is an electromagnetic implementation of the invention also feasible in addition to the mechanical implementation described above. The generalized apparatus for power transmission of the invention illustrated in FIG. 1, as described above, is capable of receiving an external power at its input end via input 131 and delivering power to an external load at its output end via output 132. An electromagnetic implementation of the power transmission apparatus of the invention is defined to be one that incorporates an electromagnetic power-transmitting device and an electrical interaction redistributing mechanism implementing the interaction redistribution electromagnetically. The electrical interaction redistributing mechanism controls the electric power supply to functioning elements of the electromagnetic power-transmitting device for implementing the redistribution of electromagnetic power transmission interaction performed. The two constituent parts are integrated together structurally in a manner according to the invention to form an apparatus that is operated as a power transmission system.

Though the power-transmitting device is limited to the electromagnetic type, the usefulness of this electromagnetic implementation of the apparatus of the invention is more versatile than the mechanical implementation described above. Due to the nature of the electromagnetic power-transmitting device incorporated, various electromagnetic implementations of the apparatus are capable of manipulating the power transmission of either the mechanical-to-mechanical, electrical-to-mechanical, mechanical-to-electrical or electrical-to-electrical mode. And, as mentioned above, the electromagnetic implementation is also capable of manipulating the power transmission in the reversed direction of power flow in many occasions, and thereby enabled to implement power regeneration.

In the electromagnetic implementation of the apparatus of the invention, the transmission of power, either electrical or mechanical, also relies on the electromagnetic interaction between the functioning elements of the electromagnetic power-transmitting device. Typical electromagnetic power-transmitting devices, generally known as electric machines or couplers, have two interacting functioning elements usually arranged in the form of a field frame and a rotor. In the electromagnetic power-transmitting device used to construct an electromagnetic implementation of the apparatus, the redistribution of the electromagnetic interaction between the two elements of the device onto the output of the apparatus is achieved by allowing both of the elements to have their respective established magnetic field rotatable with respect to the elements themselves. This relative rotation results in a difference between the angular speeds of the physical bodies of the two elements that permits the two magnetic fields of the two electromagnetic elements to be aligned for interaction while allowing the output of the apparatus to operate at its output angular speed. The extent of the angular speed of the relative rotation is adjustable and is correspondent to the angular speed of the output of the power transmission apparatus. The capability of this adjustable relative rotation is provided by the interaction redistributing mechanism for the apparatus to be described in the following paragraphs. The other element of the power-transmitting device is simply excited to establish its own magnetic field so as to interact with that established by the one that is commutated.

The electromagnetic interaction redistributing mechanism for the electromagnetic implementation of the power transmission apparatus of the invention is a rotary commutator. The rotary commutator is used to provide electrical excitation to the windings of one of the interacting elements, the commutated element, of the electromagnetic power-transmitting device. The provision of electrical excitation to the commutated element is in a switched manner in order to effect the redistribution of the electromagnetic interaction. The commutated element, with its magnetic field established by the excitation controlled by the rotary commutator, is thus capable of interacting with the magnetic field of the other of the two elements, the not-commutated element which is also properly excited, in order to effect the power transmission in the electromagnetic power-transmitting device.

The distinguished and essential characteristics of the electromagnetic implementation of the power transmission apparatus of the invention is that the rotary commutator responsible for exciting the windings of the commutated elements of the power-transmitting device is rotary as the apparatus operates. Excitation of the windings in the commutated element as switched by the rotary commutator sets up an imaginary commutation orientation vector indicative of the angular position of the magnetic field produced by the commutated electromagnetic element. This orientation vector is rotary as the apparatus operates to transmit power since the entire commutator system is itself rotary.

Note that when a DC excitation is supplied via the rotary commutator to the commutated element, the established magnetic field does appear to be rotary with respect to the physical body of the commutated element as the entire rotary commutator rotates when the apparatus operates. However, when an AC excitation is used, the magnetic field established by the commutated element is itself rotary with respect to the imaginary commutation orientation vector, namely with respect to the rotary commutator. The rotational angular speed of the magnetic field is thus the additive result of the rotation of the commutator and the frequency of the AC excitation. As mentioned, DC current is, in fact, a special case of the AC current that is alternating with zero frequency.

In terms of the basic components used, two types, namely mechanical and power electronic type, of rotary commutators are feasible for incorporation into the electromagnetic implementation of the power transmission apparatus of the invention. In a mechanical rotary commutator, one or more pairs of electrically conductive brushes are carried by a brush cage, and the entire commutator may rotate as the brush cage rotates when the apparatus operates. The rotation of the rotary commutator effects the switching of the excitation power into the commutated element of the electromagnetic power-transmitting device used to construct the apparatus of the invention. In a power electronics rotary commutator, a number of semiconductor power electronics switches are controlled in a scheme so as to effect the switching of the excitation power into the commutated interaction element of the electromagnetic power-transmitting device. The electronic commutation is substantially effected in the same manner as that by the mechanical type rotary commutator. In effect, the power electronics type of rotary commutator implements the same switching pattern for the windings of the commutated electromagnetic element as that achieved by its mechanical counterpart.

Figure 20:
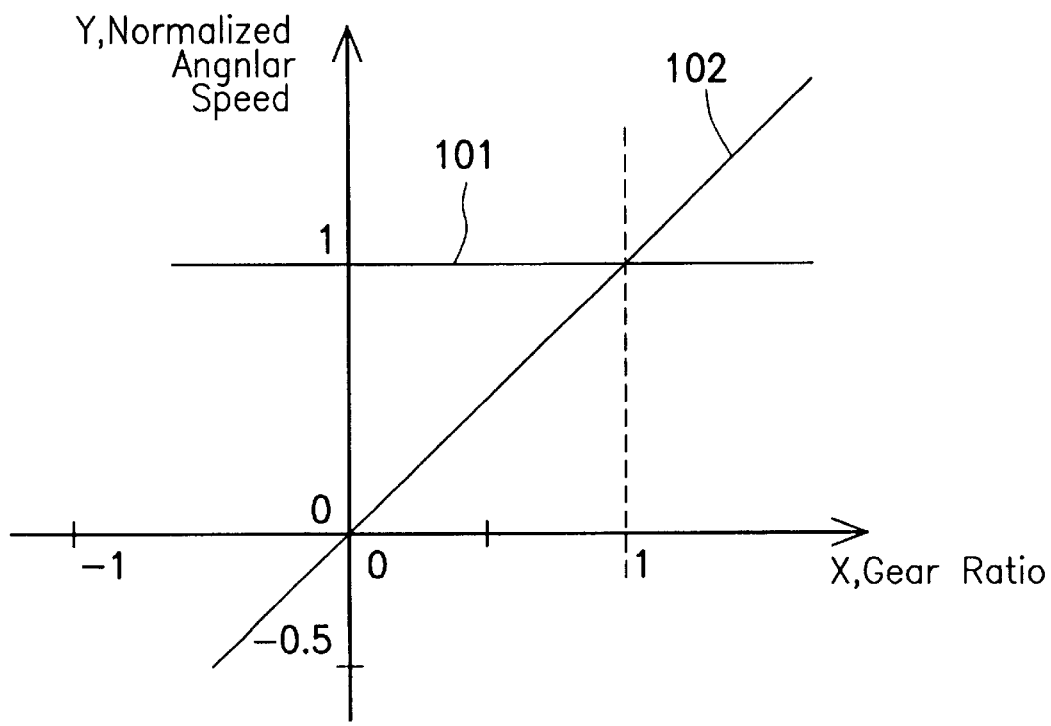
FIG. 20 illustrates the equivalent angular speed/gear ratio diagram for the elements of the power-transmitting device and the interaction redistributing mechanism of an electromagnetic implementation of the power transmission apparatus of the invention.

FIG. 20 illustrates the equivalent angular speed/gear ratio diagram for the elements of the power-transmitting device and the interaction redistributing mechanism of an electromagnetic implementation of the power transmission apparatus of the invention. The axis of abscissae represents the effective output-to-input gearing ratio of the apparatus, while the axis of ordinates represents the normalized angular speed of the functioning elements of the power-transmitting device and the rotary commutator. Similar as in the discussion for the mechanical implementation, the input power is assumed to be driving the input of the electromagnetic implementation of the apparatus at a fixed angular speed, along the input speed line 101 at the unity normalized angular speed. The output of the apparatus may move along the output speed line 102, representing that the apparatus is driving its load at different gear ratios. Again, there are occasions when the gear ratio goes beyond unity as the output outruns the input, or become negative as the output goes in the reverse direction with respect to that of the input.

Since the electromagnetic implementation of the power transmission apparatus of the invention may be involved in the transmission of both mechanical and electrical power, therefore the unit of frequency, Hz, is used for measurement on the y-axis before normalization. This unit can be conveniently converted into the rotational speed of the rotary shaft such as revolution-per-minute (RPM) when mechanical power in relation to the rotation of the physical bodies. On the other hand, Hz itself is the standard unit for representing one important characteristics of an AC electrical power.

Figure 21:
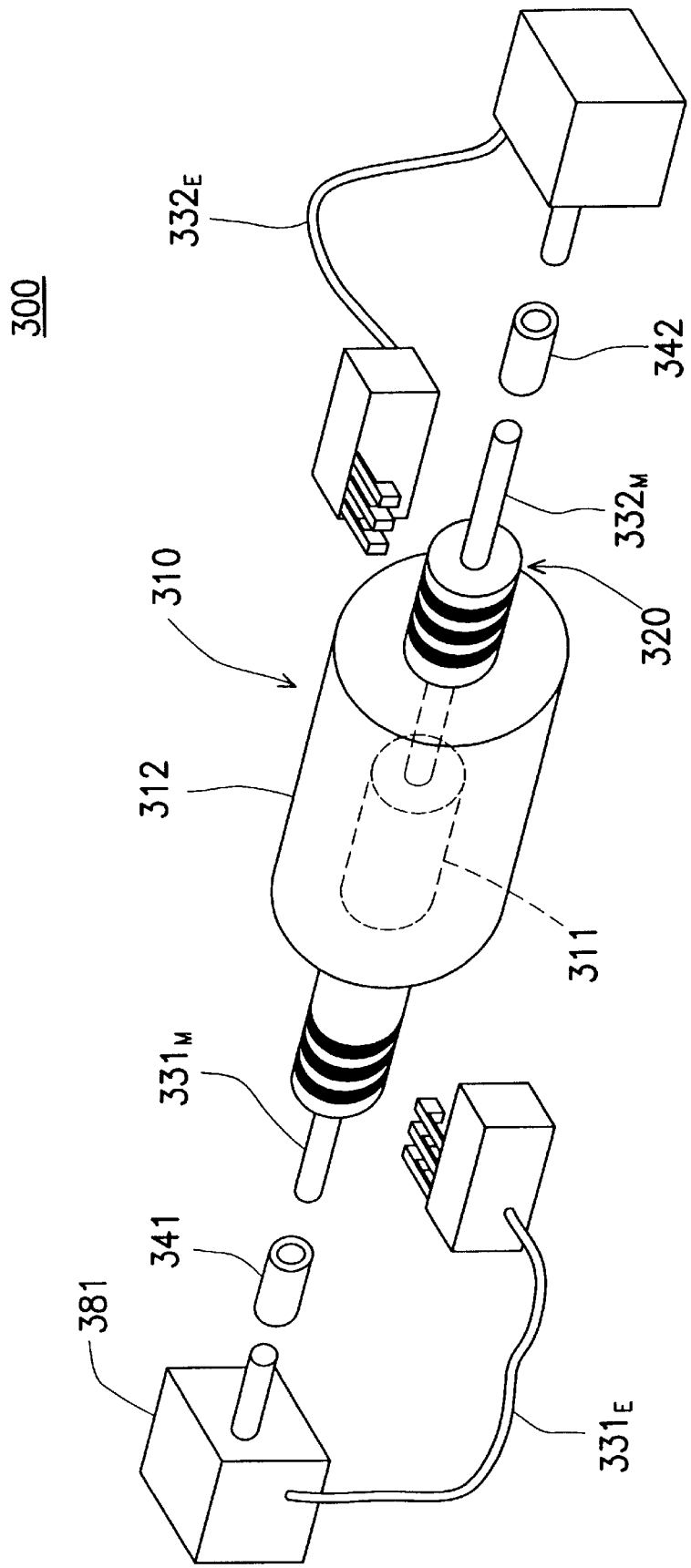
FIG. 21 illustrates a generalized electromagnetic implementation of the power transmission apparatus of FIG. 1.

FIG. 21 illustrates a generalized electromagnetic implementation of the power transmission apparatus of the invention as depicted in FIG. 1. The apparatus 300 comprises an electromagnetic power-transmitting means 310 and a rotary commutator 320, which is utilized as the electromagnetic interaction redistributing means. The electromagnetic power-transmitting means 310 is comprised of two electromagnetic interaction elements. One of the two elements, element 312 is the driving element that operates at a driving angular speed and transmits the power to the other, element 311, which is the driven element that operates at a driven angular speed, so as to implement the interaction of electromagnetic power transmission between the two, under conditioning schemes controlled by the rotary commutator 320. Note that the perspective diagram of FIG. 21 shows that the driven element 311 identified by phantom lines is enclosed inside the driving element 312.

The power transmitted inside the electromagnetic power-transmitting means 310 is received from an external power source 381 via an input $331_M$ or $331_E$ of the apparatus. The electromagnetic power-transmitting means 310 is integrated with the electromagnetic interaction redistributing means 320 to make up the electromagnetic power transmission apparatus. The power received by the electromagnetic power-transmitting means 310 from the external power source 381 is redistributed by the electromagnetic interaction redistributing means 320 onto an output $332_M$ or $332_E$ of the apparatus and delivered to an external load 382.

The electromagnetic interaction redistributing means 320 is a rotary commutator for magnetizing one of the two electromagnetic elements, 311, which is the commutated element. The rotary commutator 320 is integrated with the two electromagnetic elements 311 and 312 of the electromagnetic power-transmitting means 310, in which the rotary commutator 320 operates at a commutation angular speed to magnetize the commutated electromagnetic element 311 and establishes a first rotating magnetic field rotating at an angular speed that is synchronous with the angular speed of a second rotating magnetic field established by the electromagnetic element 312 not being commutated. The power-transmitting electromagnetic interaction of the power-transmitting means 310 operating at the synchronized angular speed of the two rotating magnetic fields is redistributed onto the output $332_M$ or $332_E$ by the rotary commutator 320, and the output delivers the power from the electromagnetic power-transmitting means 310 to the external load 382 at an output angular speed.

Note, in FIG. 21, that two inputs $331_M$ and $331_E$ and two outputs $332_M$ and $332_E$ are shown to be present for the apparatus at the input and output ends respectively. This is to schematically accommodate to the fact that both the input and the output of the power transmission apparatus of the invention is capable of handling either mechanical or electrical power. In case mechanical power is received or delivered by the apparatus, corresponding input or output rotary shaft is used. In case electrical power is received or delivered, corresponding input or output electrical lead is used. In some embodiments of the apparatus of the invention capable of performing multiple modes of power transmission, both the rotary shaft and the electrical lead for either input or output may be used.

In the electromagnetic implementation of FIG. 21, the first, 311, of the two electromagnetic elements of the power-transmitting device 310 that is commutated by the rotary commutator 320 is a magnetization-redistributing electromagnetic winding assembly, and the second element 312 without commutation is an electromagnetic assembly made up of windings. As will be explained in the following paragraphs with reference to the corresponding drawings, the commutated winding assembly of the first electromagnetic element 311 may assume one of two possible constructions, and the electromagnetic assembly for the second element 312 may take the form of one of three possible constructions. Various combinations of these two electromagnetic elements, when integrated with the electromagnetic interaction redistributing mechanism and properly excited in accordance with control schemes of the invention, may be utilized in each of the four possible power transmission modes involving both the mechanical and electrical power.

The magnetization-redistributing electromagnetic winding assembly for the first electromagnetic element 311 may be a DC armature similar in structure to the DC-excited armature of a conventional DC machine if DC excitation is intended. Or, the element 311 may also be a multiple-commutation AC armature that can be excited via more than one pair of commutator brushes or the power electronics equivalent of the rotary commutator if poly-phase AC power is used for its excitation. In either case, this winding assembly can be excited by the rotary commutator 320 for establishing the first rotating magnetic field.

The electromagnetic assembly used as the second electromagnetic element 312 may be an electromagnet winding assembly energized by a DC power and functions as an electromagnet. It can also be a poly-phase winding excited by a poly-phase AC power. Or, it may simply be a permanent magnet assembly made up of one or more properly magnetized magnets that creates a magnetic field.

FIGS. 22–27 respectively illustrate the embodiments of the electromagnetic implementation of the power transmission apparatus of the invention based on the electromagnetic power-transmitting device employing the three types of electromagnetic assembly and two types of magnetization-redistributing winding assembly described above. Each of the basic structural configuration of the power transmission apparatus of FIGS. 22–27 may be suitable for use in all or some of the four modes of power transmission involving both mechanical and electrical power. In substantial application situations, some of the embodiments may be more preferable than the others.

Note that the presence of both the mechanical rotary shaft and the electrical leads at both the input and output ends of the apparatus may not be necessary for some of the four modes of power transmission. Though in some transmission modes the electrical leads may be required to provide excitation power to the specific winding assembly of the electromagnetic element in order to effect either the input or the output of the mechanical power, they are, however, not considered to be the major power input or output. These excitation power normally consume only a small percentage of the total electrical power input to the system and are categorized as auxiliary power consumption inevitable for the implementation of an ideal machine as a real apparatus. Similarly, in some transmission modes the rotary shaft may be shown present in the drawing in which the apparatus inputs or outputs electrical power. In any case, although not discussed in detail, and as is appreciable for those skilled in the art, it is still possible that the electromagnetic implementation of the power transmission apparatus of the invention be operated to handle both the mechanical and electrical power input and/or output simultaneously if any such requirement exists.

Figure 22:
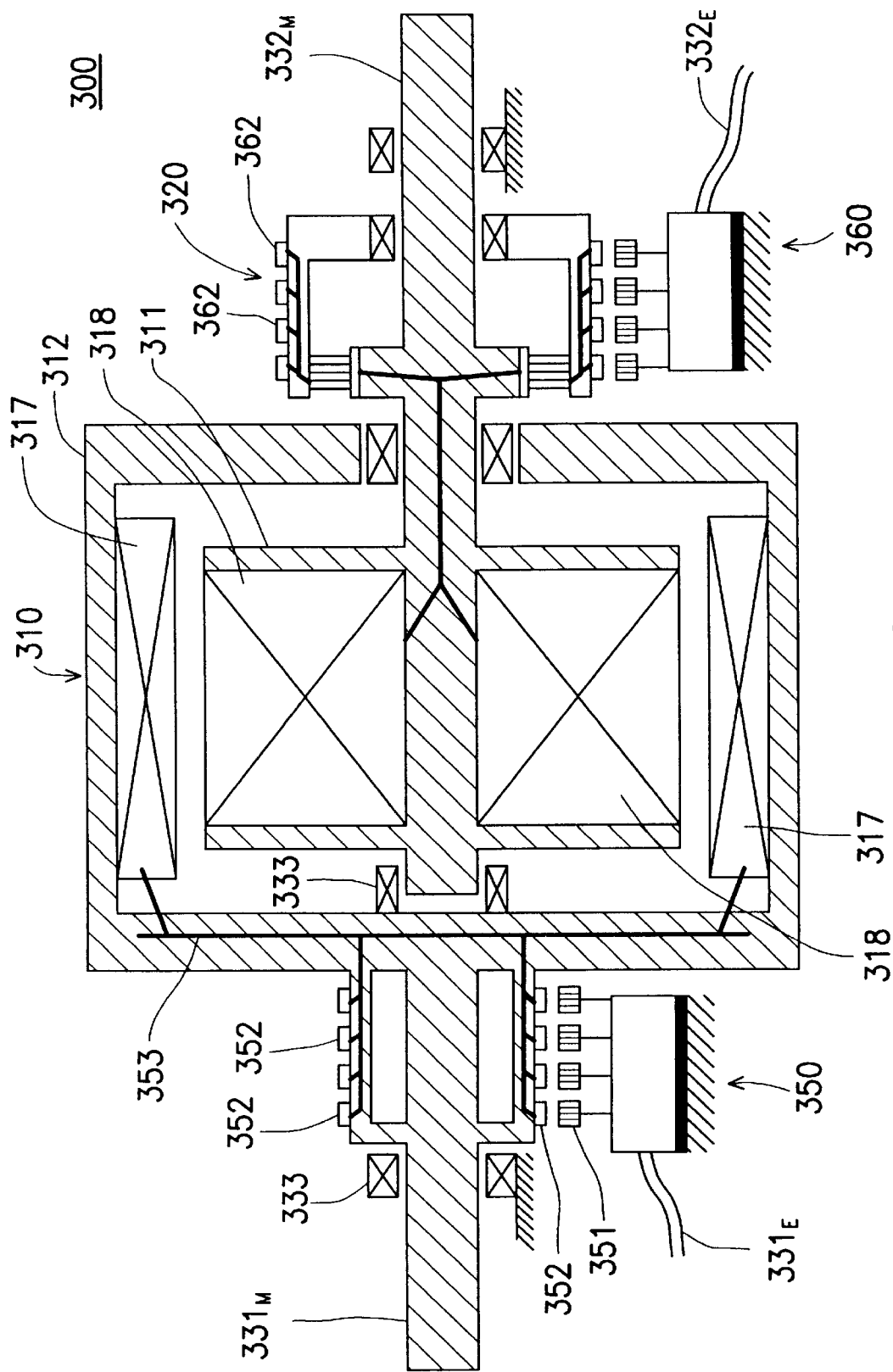
FIG. 22 illustrates a cross-sectional view of an embodiment of the generalized electromagnetic implementation of FIG. 21 in which the electromagnetic assembly is a polyphase winding and the magnetization-redistributing electromagnetic winding assembly is an AC armature.

FIG. 22 illustrates an embodiment of the generalized electromagnetic implementation of the power transmission apparatus of the invention as depicted in FIG. 21. The basic structural configuration of the power transmission apparatus of FIG. 22 is suitable for use in all four modes of power transmission, which involves both mechanical and electrical power. In this embodiment, the magnetization-redistributing electromagnetic winding assembly 311 used as the commutated first electromagnetic element of the electromagnetic power-transmitting device is an AC armature. This AC armature 311 is comprised of a number of electrically-switchable AC windings 318. Each of the AC windings 318 can be excited by a poly-phase AC current switchingly supplied by the rotary commutator 320 in an orderly manner so as to establish the first rotating magnetic field. In order to switch the poly-phase AC power into the winding assembly 311, there are more than one pair of conductive brushes 321 or their power electronics equivalent in the rotary commutator 320.

The electromagnetic assembly 312 used as the second and non-commutated electromagnetic element is a poly-phase winding having a winding 317 that can be excited by a poly-phase AC current in order to establish the second rotating magnetic field. An angular speed of the imaginary commutation orientation vector of the rotary commutator 320 not shown in the drawing may be asynchronous with the angular speed of the second rotating magnetic field established by the electromagnetic assembly 312 of the second electromagnetic element. Specifically, the orientation vector angular speed is equal to the difference of the angular speed of the second rotating magnetic field and the angular speed of the poly-phase AC current supplied by the rotary commutator 320 to the first electromagnetic element 311.

When the electromagnetic implementation of the apparatus as depicted in FIG. 22 is used to implement mechanical-to-mechanical power transmission, the physical body of the electromagnetic assembly 312 can be driven by an external mechanical power source via its rotary shaft $331_M$. In this case, the electrical lead $331_E$ is used to supply the excitation power for the electromagnetic assembly 312 to establish its magnetic field. As the physical body of this second electromagnetic element 312 is driven rotating, its excitation can be provided by either AC or DC electrical power. This excitation is supplied from the external excitation power source utilizing the carbon brush-slip ring arrangement of the non-commutated element excitation means generally identified by 350. Each of the fixed carbon brushes 351 contacts its corresponding slip ring 352 that rotates together with the physical body of the electromagnetic assembly 312. An electric power supply network 353 fixed to or embedded in the physical body of the element 312 distributes the excitation power to the windings 317 of the non-commutated element 312.

In case DC excitation is adopted for the second electromagnetic element 312, the angular speed of the magnetic field established by this second element is simply the input rotational speed of the external power source as supplied by the external mechanical power source via the input rotary shaft $331_M$. In case of AC excitation, the angular speed of this magnetic field is the additive result of the angular speed of the external mechanical power source and that of the AC excitation.

On the other hand, the physical body of the commutated element 311 can be connected to the output shaft $332_M$ of the apparatus and used to drive an external mechanical load. The commutated element 311 receives its excitation via the electrical lead $332_E$ connected through the rotary commutator 320. This excitation is supplied from the external excitation power source utilizing another carbon-slip ring mechanism 360. Similar to 350, the carbon brush-slip ring excitation mechanism 360 employs fixed carbon brushes 361 and slip rings 362 to facilitate excitation power supply to the commutated element 311. Since the imaginary commutation orientation vector is rotary, the slip rings 362 of the excitation mechanism 360 are fixed to the brush cage 322 of the rotary commutator 320. This arrangement allows the brushes 321 of the rotary commutator 320 which are attached to the brush cage 322 for rotation in the controlled schemes to receive the excitation electrical power from external, although its detailed mechanism is not shown in the drawing. An electrical power supply network 363 fixed to or embedded in the physical body of the element 311 distributes the excitation power to the windings 318 of the commutated element 311.

Since the physical body of the commutated element 311 is also rotating as the apparatus operates to transmit mechanical power, the angular speed of the imaginary commutation orientation vector required for operating the apparatus can be determined from the angular speed of the output shaft $332_M$ and that of its excitation. In case that DC excitation is supplied to the commutated element 311, the required angular speed of the commutation orientation vector becomes equal to that of the magnetic field established by the second electromagnetic element 312.

Note in the drawing of FIG. 22 that suitable bearings means 333 are provided at the necessary locations within the apparatus. This permits smooth lubricated relative rotational motions between the various elements of the power-transmitting means 310 and the interaction redistributing means 320.

The power transmission apparatus of FIG. 22 is also suitable for use in electrical-to-mechanical power transmission. In this case, the physical body of the electromagnetic assembly 312 is fixed stationary, and its electrical lead 331$_E$ is electrically coupled to the external electrical power source for supplying the primary electrical power to the electromagnetic assembly 312 itself in order to establish its driving magnetic field. Excitation power is supplied utilizing the slip-ring mechanism 350, or a simplified electrical distribution system as the physical body of the electromagnetic assembly 312 is fixed stationary. Since the physical body of this second electromagnetic element 312 is held stationary, the angular speed of the magnetic field generated in itself by the power excitation is determined directly by the frequency of the electrical power excitation.

Meanwhile, the physical body of the commutated element 311 can be connected to the output shaft 332$_M$ of the apparatus and used to drive the external mechanical load. The commutated element 311 receives its excitation via the electrical lead 332$_E$ connected through the rotary commutator 320. Excitation power is supplied utilizing the slip-ring mechanism 360. As is in the case of mechanical-to-mechanical transmission, since the physical body of the commutated element 311 is rotating as the apparatus operates to transmit power, the angular speed of the imaginary commutation orientation vector can be determined from the angular speed of the output shaft 332$_M$ and that of its excitation. In case that DC excitation is supplied to the commutated element 311, the angular speed of the commutation orientation vector becomes equal to that of the magnetic field established by the second electromagnetic element 312.

The power transmission apparatus of FIG. 22 is further suitable for use in mechanical-to-electrical power transmission. In this case, the physical body of the electromagnetic assembly 312 can be driven by the external mechanical power source via its rotary shaft 331$_M$. The electrical lead 331$_E$ is used to supply the excitation power for the electromagnetic assembly 312 in order to establish its magnetic field. As the physical body of this second electromagnetic element 312 is driven rotating, its excitation can be provided by either AC or DC electrical power. Slip-ring mechanism 350 supplies excitation power to the windings 317 of the assembly 312. In case of DC excitation, the angular speed of the magnetic field established by this second element is simply the input rotational speed of the external power source. In case of AC excitation, the angular speed of the magnetic field is the additive result of the angular speed of the external mechanical power source and that of the AC excitation.

Meanwhile, the physical body of the commutated element 311 is fixed stationary, and the electrical lead 332$_E$ connected through the rotary commutator 320 becomes the output of the power transmission apparatus that can drive an external electrical load. Electrical power collecting means simpler in construction than the slip-ring mechanism 360 can be used to collect the generated electrical power. Current flowing in the windings 318 of the first element 311 as switched by the rotary commutator 320 establishes a magnetic field that interacts with the one generated by the second element 312 to effect the mechanical-to-electrical mode of power transmission.

The power transmission apparatus of FIG. 22 may also be used for electrical-to-electrical power transmission. In this case, the physical body of the electromagnetic assembly 312 is fixed stationary, and its electrical lead 331$_E$ is electrically coupled to the external electrical power source for supplying the primary electrical power to the electromagnetic assembly 312 in order to establish its driving magnetic field. As physical body of this second electromagnetic element is held stationary, the angular speed of the magnetic field generated in the electromagnetic assembly 312 by the power excitation is determined directly by the frequency of the electrical power.

On the other hand, the physical body of the commutated element 311 is also fixed stationary, and the electrical lead 332$_E$ connected via the rotary commutator 320 becomes the output of the apparatus that can drive an external electrical load. Current flowing in the windings of the first element 311 as switched by the rotary commutator 320 establishes a magnetic field that interacts with the one generated by the second element 312 to effect the electrical-to-electrical mode of power transmission. The slip-ring mechanisms 350 and 360 in this electrical power transmission can be simplified, since the physical bodies of both the electromagnetic assembly 312 and the commutated element 311 are fixed stationary.

Figure 23:
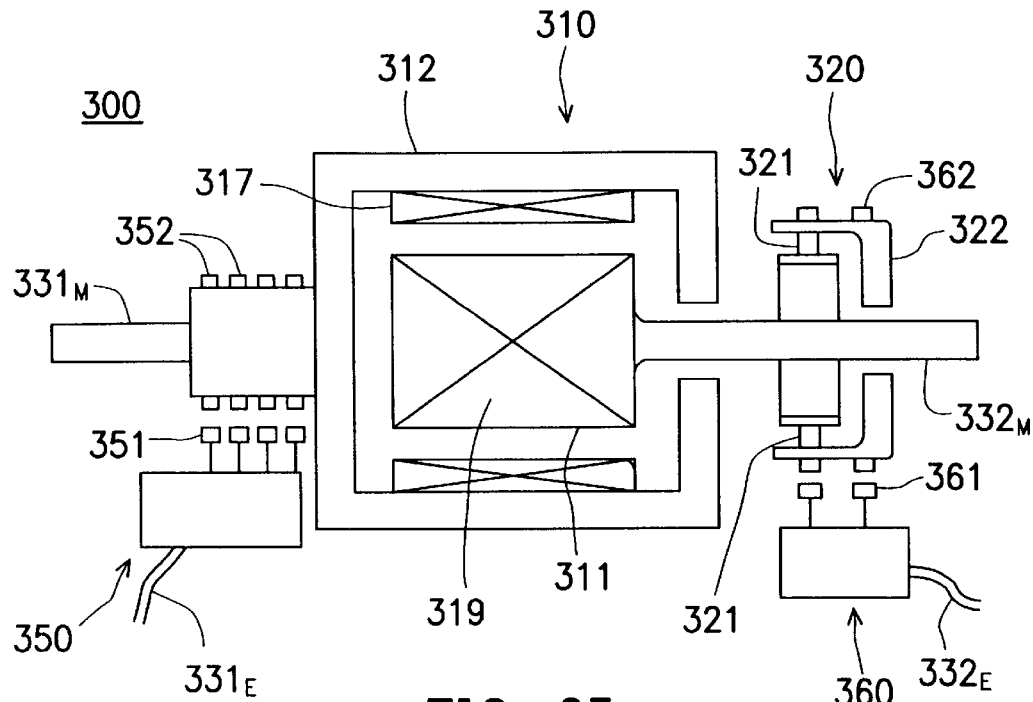
FIG. 23 illustrates the cross-sectional view of an embodiment of the generalized electromagnetic implementation of FIG. 21 in which the electromagnetic assembly is a polyphase winding and the magnetization-redistributing electromagnetic winding assembly is a DC armature.

FIG. 23 illustrate another embodiment of the electromagnetic implementation of the power transmission apparatus of the invention of FIG. 21. This is an apparatus only slightly different from that of FIG. 22. Specifically, instead of the AC armature, the magnetization-redistributing electromagnetic winding assembly 311 used as the commutated first electromagnetic element of the electromagnetic power-transmitting device is a DC armature, which is comprised of a number of electrically-switchable DC windings 319. The electromagnetic assembly 312 used as the second electromagnetic element is a poly-phase winding similar to that of FIG. 22. Since, as mentioned above, DC is considered to be a special case of AC, it can be expected that this embodiment is a special case, and in effect a simplified version, of the apparatus of FIG. 22.

In order to switch the DC power into the winding assembly 311, only one pair of conductive brushes 321 or their power electronic equivalent are required in the rotary commutator 320. To operate this apparatus, the angular speed of the imaginary commutation orientation vector of the rotary commutator 320 needs to be synchronous to the angular speed of the second rotating magnetic field established by the electromagnetic assembly 312 of the electromagnetic power-transmitting device 310. Specifically, the angular speed of the orientation vector is equal to the angular speed of the second magnetic field. This can be achieved by controlling the angular speed of the brush cage 322 that holds and drives the brushes 321 in the manipulated switching scheme.

Thus, when operated in either the mechanical-to-mechanical, electrical-to-mechanical or mechanical-to-electrical mode of transmission, the excitation in the commutated element 311 can be simple DC power, and the control of the imaginary commutation orientation vector is simply required to be synchronous to the rotation of the magnetic field established by the electromagnetic assembly 312.

When operated in the electrical-to-electrical mode of power transmission, the output of the apparatus, electrical leads 332$_E$ connected via the rotary commutator 320, produces only DC power if the imaginary commutation orientation vector of the rotary commutator 320 is maintained synchronous to the rotation of the magnetic field produced by the powering electromagnetic assembly 312. If, however, the orientation vector is controlled to be asynchronous to the powering magnetic field, the generated electrical power becomes an AC electrical power. The frequency of this AC power is determined by the subtractive result of the angular speeds of the input electrical power and that of the orientation vector.

Figure 24:
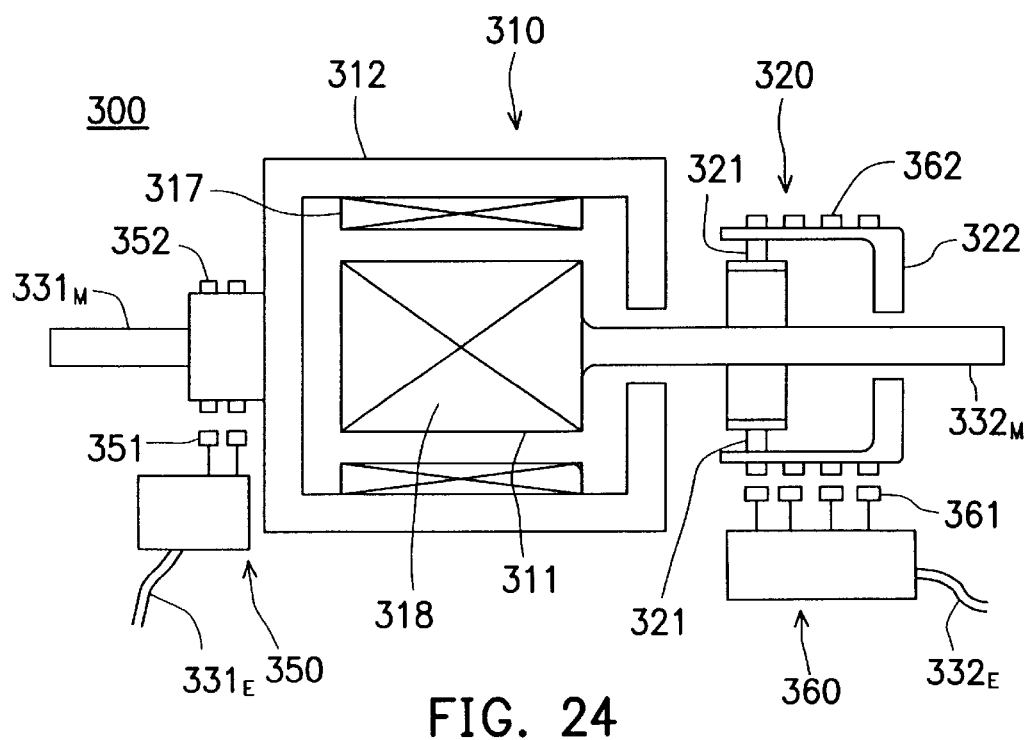
FIG. 24 illustrates the cross-sectional view of an embodiment of the generalized electromagnetic implementation of FIG. 21 in which the electromagnetic assembly is an electromagnet winding and the magnetization-redistributing electromagnetic winding assembly is an AC armature.

FIG. 24 illustrates yet another embodiment of the electromagnetic implementation of the power transmission apparatus of the invention fundamentally outlined in FIG. 21. This is an apparatus also slightly different from that of FIG. 22. The difference being the replacement of the poly-phase winding for the electromagnetic assembly 312 by an electromagnet winding assembly. Such an electromagnet winding assembly is similar to the stator winding of a DC machine and, like an electromagnet, produces a magnetic field non-rotatable with respect to its physical body when energized.

Such an apparatus is suitable for mechanical-to-mechanical and mechanical-to-electrical mode of power transmission. In these two modes, the apparatus behaves similar to that of FIG. 22 except that the excitation to the electromagnetic assembly 312 is DC. This apparatus is not preferred for operation in the electrical-to-mechanical mode of transmission, assuming that the physical body of the electromagnetic assembly 312 is fixed stationary. When thus operated, the apparatus of FIG. 24 becomes substantially the same as a conventional DC motor. If both physical bodies of the electromagnet winding assembly 312 and the AC armature 311 of this embodiment is fixed, the electrical-to-electrical mode of transmission is not feasible since there is no transformer operation exists in the system. This is because that the magnetic field established by the electromagnet winding assembly 312 is not rotating with respect to the conductors of the AC armature 311 at all.

Figure 25:
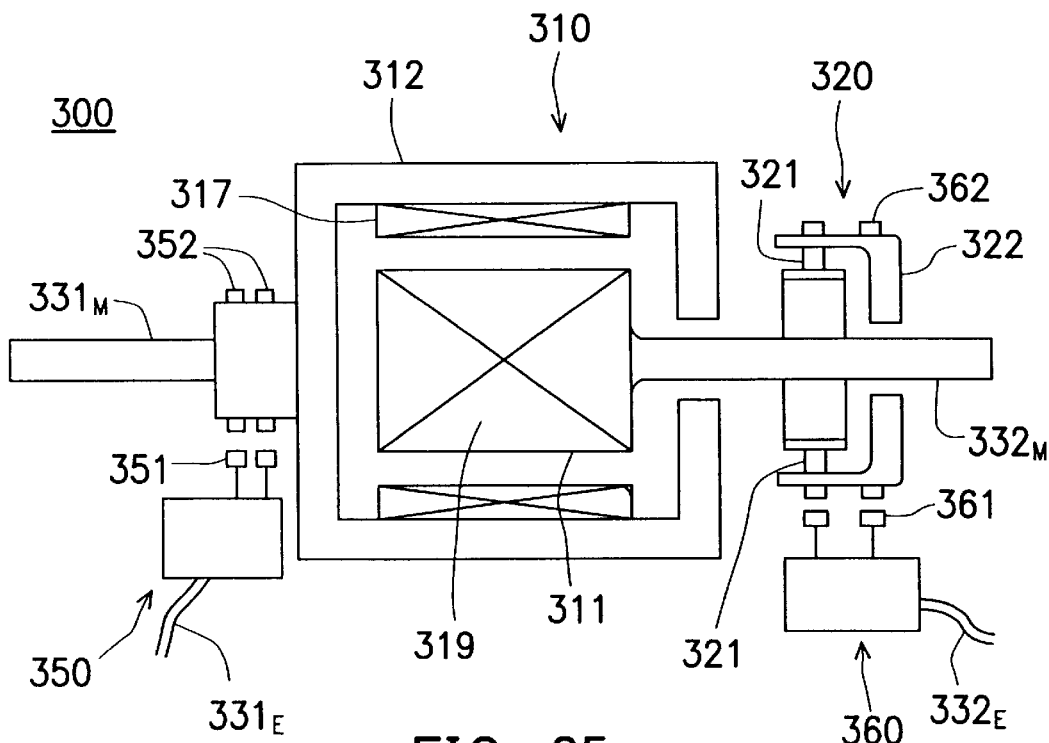
FIG. 25 illustrates the cross-sectional view of an embodiment of the generalized electromagnetic implementation of FIG. 21 in which the electromagnetic assembly is an electromagnet winding and the magnetization-redistributing electromagnetic winding assembly is a DC armature.

FIG. 25 illustrates another embodiment of the electromagnetic implementation of the power transmission apparatus of the invention outlined in FIG. 21. This apparatus differs from the apparatus of FIG. 24 only in that the magnetization-redistributing electromagnetic winding assembly 311 is a DC armature instead of AC. As such, the characteristics of this apparatus is basically the same as the embodiment of FIG. 24. Apparently, the excitation to the AC armature 311 in the embodiment of FIG. 24 is preferably poly-phase AC electrical power, while the DC armature 31 1 of this embodiment requires DC excitation.

Figure 26:
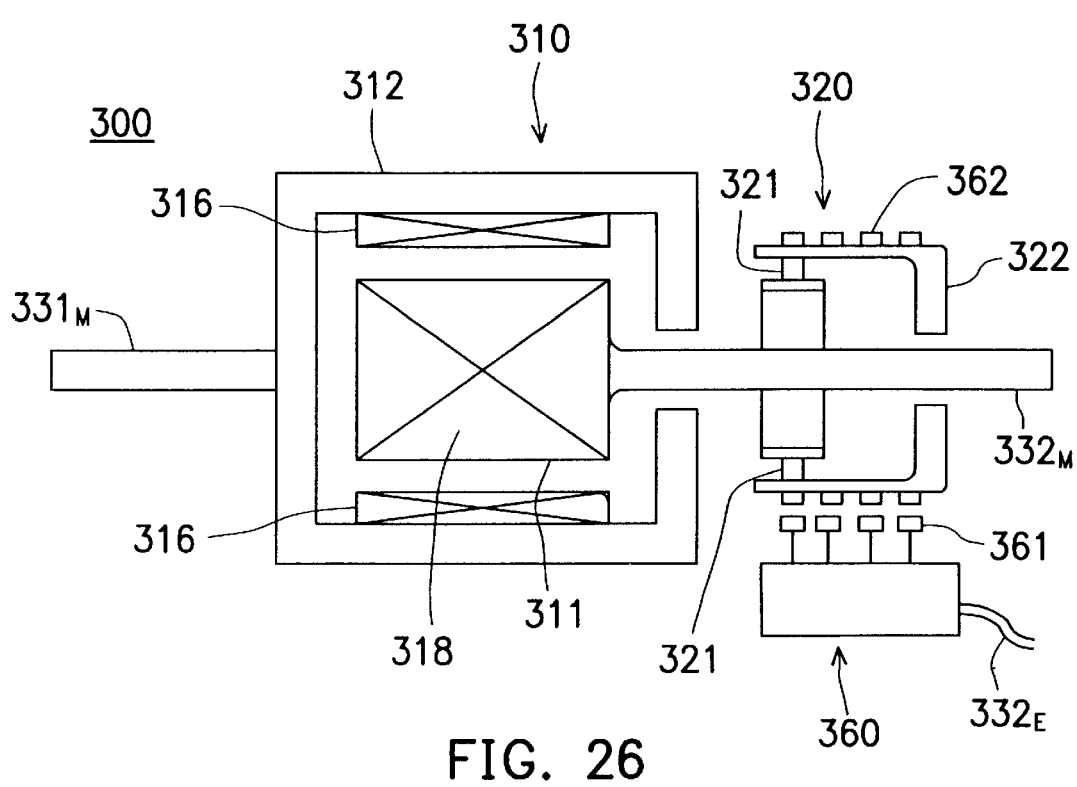
FIG. 26 illustrates the cross-sectional view of an embodiment of the generalized electromagnetic implementation of FIG. 21 in which the electromagnetic assembly is a permanent magnet assembly and the magnetization-redistributing electromagnetic winding assembly is an AC armature.

FIG. 26 illustrates still yet another embodiment of the electromagnetic implementation of the apparatus of the invention. This apparatus is effectively the same as that of FIG. 24 except that a permanent magnet assembly including at least a pair of permanent magnets 316 for the electromagnetic assembly of FIG. 21 replaces the electromagnet winding assembly of FIG. 24. Electrical excitation to the electromagnetic assembly 312 is thus not required, and the system electrical configuration becomes simplified. However, the electromagnet winding assembly of the embodiment of FIG. 24 is capable of providing magnetic field with stronger field intensity than permanent magnets as its excitation power is increased proportionally. Thus, power rating of the apparatus of FIG. 26 is limited to a level the material technology of permanent magnet can provide.

Figure 27:
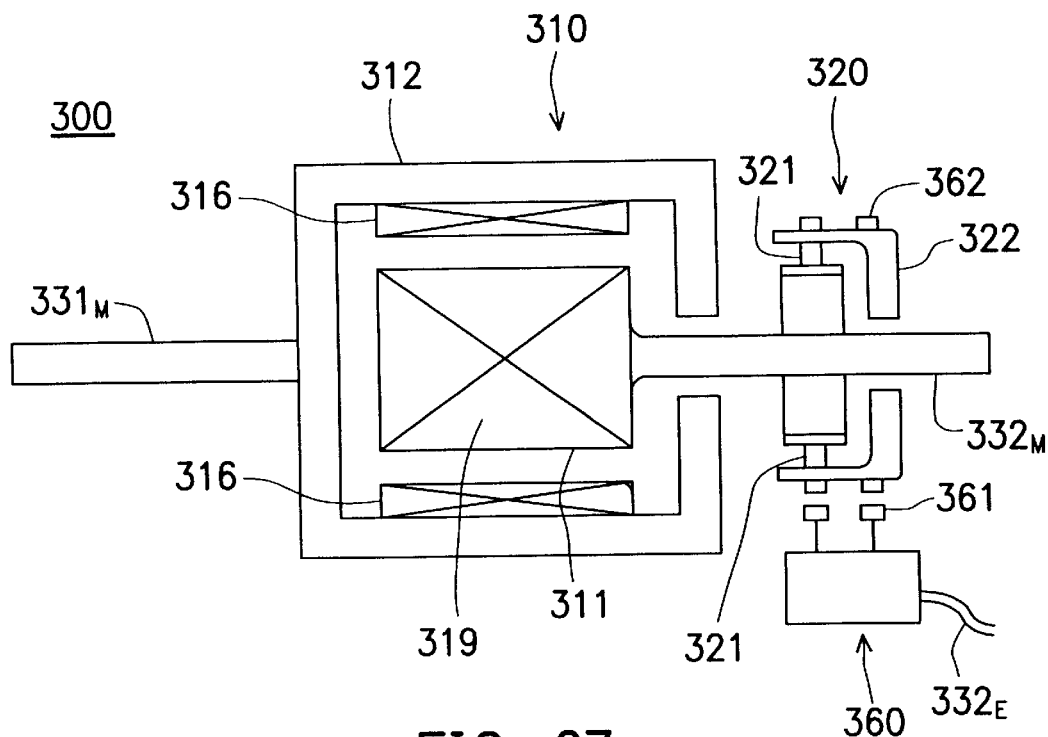
FIG. 27 illustrates the cross-sectional view of an embodiment of the generalized electromagnetic implementation of FIG. 21 in which the electromagnetic assembly is a permanent magnet assembly and the magnetization-redistributing electromagnetic winding assembly is a DC armature.

The electromagnetic implementation of the power transmission apparatus of the invention as exemplified in FIG. 27 is a further-simplified version of that of FIG. 26. A DC armature 311 for the magnetization-redistributing electromagnetic winding assembly of FIG. 21 replaces the AC armature 311 of FIG. 26. Thus, the operating characteristics of this embodiment of FIG.24 is substantially the same as that of FIG. 27 except that DC excitation is used for the DC armature 311.

Each of the embodiment as outlined in FIGS. 22–27, when operated in the mechanical-to-mechanical mode of power transmission, can be utilized as a mechanical transmission device for converting an input mechanical power at one speed/torque combination into an output at another. This is in effect equivalent in function to that of the traditional mechanical power-transmitting devices such as hydraulic torque converters or generator-motor sets found application in automotive and diesel-electric locomotives. However, low-speed performance of the apparatus of the invention as exemplified in these embodiments may enjoy high efficiency since the power-transmitting electromagnetic devices incorporated are restricted by the rotary commutator to operate within their optimized speed range.

When operated in the electrical-to-mechanical mode of power transmission, each of these embodiments are in effect a new version of electric motor operating under the principle of electromagnetism. These are thus electric machines directly applicable for electric traction drive applications without sophisticated power electronics such as PWM. However, each of these apparatus of the invention is capable of delivering good low-speed performance since the rotary commutator allows the incorporated electromagnetic power-transmitting device, effectively a modified version of the conventional electric machine, to operate in the optimized speed range of that of a conventional motor.

When operated in the mechanical-to-electrical mode of power transmission, each of these embodiments is in effect a new version of electric generator operating under the principle of electromagnetism. Each of these apparatus of the invention is capable of delivering good low-speed electric generation performance since the rotary commutator allows the electromagnetic power-transmitting device, effectively a modified version of the traditional electric machine, to operate in the optimized speed range of that of a conventional generator.

In the mechanical-to-electrical and electrical-to-mechanical modes of power transmission performed by the embodiments of FIGS. 22–27, the phase angle between the two magnetic fields established by the two interacting elements of the electromagnetic power-transmitting device can be utilized as a parameter for controlling the rate of power transmission as performed by the apparatus. In general, the driving magnetic field of the electromagnetic assembly 312 leads the driven of the commutated element 311 for an angle that is proportional to the power transmitted. In other words, the larger the leading phase angle, the larger the power transmitted. If the one electromagnetic element that was originally leading becomes lagging, then the direction of power transmission is reversed, and the apparatus operates to regenerate.

In the mechanical-to-mechanical mode of transmission of the embodiments, the phase angle between the magnetic fields is settled to an angle determined by the input and load conditions. In the electrical-to-electrical mode of transmission in which the commutated element is a DC armature, the phase angle can be used to control the output voltage of the generated DC power if the imaginary commutation orientation vector is controlled to rotate synchronous to the power magnetic field of the electromagnetic assembly. On the other hand, if the orientation vector is operated asynchronous to the power magnetic field, then the apparatus simply produces a single-phase AC electrical power. This assumes that DC armature has only one pair of commutator brushes or their power electronic equivalent for picking up the generated electrical power. To facilitate such phase angle control, suitable control mechanism can be provided and integrated into the rotary commutator system.

When operated in the electrical-to-electrical mode of power transmission, each of the applicable embodiments of FIGS. 22–27 is in effect a frequency converter that operates substantially as a transformer. The angular speed of the imaginary commutation orientation vector of the rotary commutator 320 can be utilized as a controlling parameter to determine the frequency of the output AC power. If the orientation vector is controlled to be synchronous with the rotation of the driving magnetic field of the second electromagnetic element 312, then the output electrical power delivered by the electrical lead $332_E$ connected through the rotary commutator 320 is an AC power of zero alternating frequency. Specifically, this is DC electrical power.

When, however, the imaginary commutation orientation vector is controlled to be rotating at an angular speed that is either faster or slower than the rotating magnetic field of the electromagnetic assembly 312, then the frequency of the AC power as picked up by the rotary commutator 320 from the commutated element 311 is the difference between the two. In this case, the apparatus becomes a poly-phase frequency converter capable of converting a poly-phase AC electric power of an input frequency into another with an output frequency different from the input.

When the apparatus exemplified in FIG. 21 or, in other words, each of the specific embodiments of FIGS. 22–27 is operated in the mechanical-to-mechanical and electrical-to-mechanical modes of power transmission, the apparatus exhibits a natural tendency of automatic acceleration as the input mechanical or electrical power is received by the apparatus. The power received by the apparatus is transmitted and delivered to the external mechanical load, which accelerates along the gear ratio diagram of FIG. 20, assuming the external power source is driving the apparatus at a constant angular speed. In the case of the electrical-tom-mechanical power transmission, this is an advantageous characteristics suitable for vehicular and industrial electric traction drive applications. In the case of mechanical-to-mechanical power transmission, this tendency is an advantage similar as was in the case of the mechanical implementation of the power transmission apparatus of the invention described above.

Figure 28:
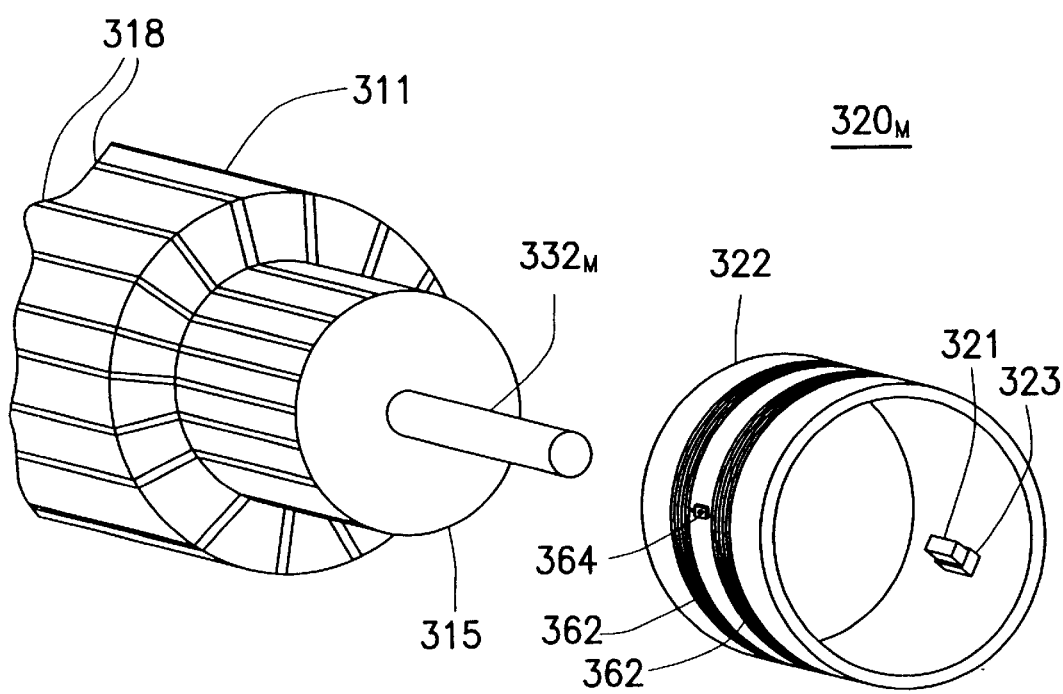
FIG. 28 illustrates the structural configuration of a mechanical rotary commutator suitable for incorporation into the electromagnetic implementation of the power transmission apparatus of the invention.
Figure 29:
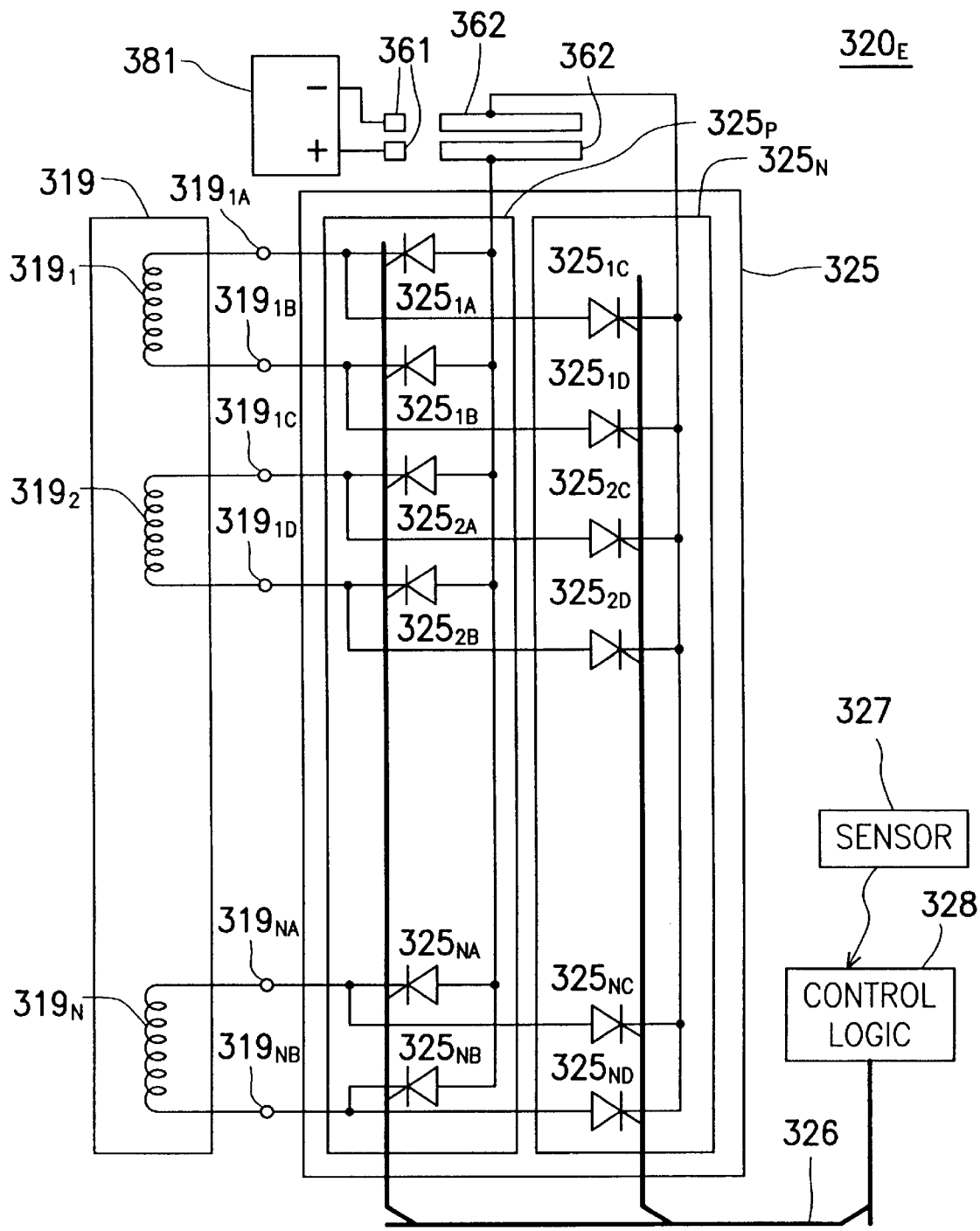
FIG. 29 is a schematic diagram showing the circuitry configuration of a power electronics rotary commutator suitable for incorporation into the electromagnetic implementation of the power transmission apparatus of the invention.

In the embodiments outlined in FIGS. 22–27 and described above, the rotary commutator integrated with the electromagnetic power-transmitting device can be either a mechanical or a power electronics rotary commutator. Mechanical rotary commutator is relatively simple in construction that can be integrated with the power-transmitting device and is also easy to operate. However, mechanical rotary commutators operating via frictional contact between the carbon brushes and the commutator ring require regular maintenance in order to prevent and reduce problems caused by short-circuiting. On the other hand, a power electronics rotary commutator based on semiconductor power electronic switching circuitry is relatively more sophisticated both to construct and integrate into the system. However, a power electronics rotary commutator can more readily be incorporated into a digital control system so that the power transmission apparatus can be operated digitally. In addition, there is no carbon brush wear problem associated with power electronics rotary commutators. FIGS. 28 and 29 respectively exemplify a mechanical and a power electronics rotary commutator for the electromagnetic implementation of the power transmission apparatus of the invention.

FIG. 28 illustrates a mechanical type of rotary commutator that can be integrated with the electromagnetic power-transmitting devices such as those exemplified in the apparatus embodiments of FIGS. 22–27. The perspective view of FIG. 28 only shows the major components of the mechanical rotary commutator. The mechanical rotary commutator $320_M$ is comprised of a number of, for example, three pairs of carbon brushes and a brush cage. In the drawing, only one pair of brushes 321 is shown fixed to the inner circumferential surface of the brush cage 322. The number of pairs of carbon brushes is dependent on the configuration of the armature utilized as the magnetization-redistributing electromagnetic winding assembly 311 of the embodiments of FIGS. 22–27. If the commutated armature 311 is DC-excited, a single pair of carbon brushes is sufficient. If the commutated armature 311 requires poly-phase AC excitation, more than one pair of brushes are necessary.

The brush cage 322 is a framework used as the carrier for the carbon brushes. The brush cage 322 has, for example, a substantially hollow cylindrical configuration, and each of the carbon brushes 321 is installed on the inner circumferential surface of the cage at the respective designated location. Each of the carbon brushes 321 is installed to the cage 322 by, for example, insertion into a container housing 323. Each of these housings 323 provides a holding means for its corresponding carbon brush 321 on the inner surface of the cage 322, and pressure means such a spring installed between the carbon brush 321 and the bottom of the housing 323 presses the contacting surface of the carbon brush 321 against the commutator ring 315 of the armature 311 as the cage 322 is assembled in its proper position in the system. The pressure means also permits a carbon brush 321 to move inwards along the radial axis of the cage 322 as it is worn out due to prolonged frictional operation.

The central hollow space inside the brush cage 322 of the rotary commutator $320_M$ allows for the insertion of the shaft $332_M$ and the commutator ring 315 of the armature 311. When properly assembled, each of the brushes 321 carried by the cage 322 can be aligned with the commutating surface of the commutator ring 315 and allowing pressurized contact of the brushes 321 against the commutator ring 315 on their respectively designated and angularly spaced locations.

When external electrical power source is required to excite the armature 311 of the apparatus, each of the carbon brush container housing 323 can be electrically connected to a corresponding slip rings 362 fixed to the outer circumferential surface of the brush cage 322, as is schematically shown by the electrical connection 364 penetrating through the wall of the cylindrical body of the cage 322. The reason to use slip rings 362 is based on the fact that the rotary commutator $320_M$ for the apparatus of the invention is rotary itself. In other words, the rotary commutator $320_M$ has its brush cage 322 rotates with respect to the chassis of the apparatus as the apparatus operates. Electrically conductive paths established by the corresponding groups of carbon brush 321, the brush container housing 323 and the slip ring 362 may be used to provide the excitation power from the external excitation power source to the windings 318 of the armature 311 via the commutator ring 315.

Rotational speed of the brush cage 322 of the rotary commutator $320_M$ is controlled under schemes depending on the structural configuration of the apparatus of the invention. The speed is also dependent on the mode of power transmission and the nature of the power involved such as frequency of AC power. When the rotary commutator $320_M$ is required to rotate so that its imaginary commutation orientation vector determined by one of the brush pairs rotates asynchronous to that of the magnetic field produced by the electromagnetic assembly not shown in FIG. 28, in general, a controlled rotary drive is needed to drive the brush cage 322 for rotation according to the speed control scheme.

In a special case that the rotary commutator $320_M$ is required to rotate synchronous to the physical body of the electromagnetic assembly 312 of the non-commutated element, the brush cage 322 can simply be fixed to the physical body of the assembly 312 so that both rotate together synchronously. For example, in the embodiment of FIG. 27 in which permanent magnets 316 of the non-commutated element 312 is used to generate the first magnetic field, its brush cage 322 can be fixed directly to the frame of the element 312.

FIG. 29 illustrates the schematic diagram of a power electronic type of rotary commutator that can be integrated into the electromagnetic implementations of the apparatus such as those exemplified in the embodiments of FIGS. 22–27. The power electronics rotary commutator $320_E$ is comprised of a semiconductor switch array 325 and a control logic 328. This semiconductor commutator $320_E$ may be carried onboard the physical body of the commutated element, 311 of FIGS. 22–27, so that its semiconductor switches $325_{1A}$–$325_{1D}$, $325_{2A}$–$325_{2D}$, ... and $325_{NA}$–$325_{ND}$ can be connected to the windings $319_1$, $319_2$, ... and $319_N$ of element 311 shown organized in the schematic diagram as the winding array 319 for implementing the necessary excitation switching scheme. This assumes a total of N windings are wound in the commutated element 311. The switch array 325 is responsible for supplying excitation electrical power to the windings $319_1$, $319_2$, ... and $319_N$ of the commutated element 311. In case the excitation power source is provided external to the apparatus, a pair of slip rings 362 can be used to receive excitation from the external power source 381 via their corresponding carbon brushes 361.

The switching scheme implemented by the switch array 325 is under control of the control logic 328. The control logic 328 implements its control scheme based on the angular speed and position of the magnetic field generated by the non-commutated electromagnetic assembly 312. Angular position and speed of the magnetic field established by the assembly 312 may be detected utilizing a sensor arrangement 327, which may be coupled to the control logic 328 via, for example, photoelectric coupling, for relaying its detected signals.

In the depicted circuitry example of FIG. 29, the power electronics rotary commutator $320_E$ is equivalent in function to a mechanical counterpart having a single pair of brushes and receiving DC excitation, such as the one of FIG. 28. An external DC power source 381 provides the excitation electrical power via the rotary frictional contact of the slip rings 362 and their corresponding carbon brushes 361. The semiconductor switches in the switch array 325 are organized into two groups, i.e. the positive $325_P$ and the negative group $325_N$, with each group including half the total number of switches. Each of the windings $319_1$, $319_2$, ... and $319_N$ of the commutated element 311 has two terminals that require switched connection to the excitation power source 381. Each of its two terminals needs to be switched onto both the positive and negative terminals of the excitation power source 381 in the scheme governed by the control logic 328. Assuming the use of SCR (silicon-controlled rectifier) as the semiconductor switching element, each terminal of a winding of the commutated element 311 thus requires two SCR's to be connected to the positive and negative terminals of the power source 381 in order to form a complete circuit loop so that excitation may take place. Thus, for a total of N windings in the array 319, a total of 4N SCR switches are required in the switch array 325 in this described example.

For example, consider the winding $319_1$ in winding array 319. One of its two terminals $319_{1A}$ is allowed to be connected to both the positive and negative terminals of the excitation power source 381 via the SCR $325_{1A}$ and $325_{1C}$ respectively. The other terminal $319_{1B}$ is also allowed to be connected to the positive and negative terminals via SCR $325_{1B}$ and $325_{1D}$ respectively. When the excitation requirement is for the terminal $319_{1A}$ of winding $319_1$ to be connected to the positive terminal and the terminal $319_{1B}$ to the negative, the control logic 328 turns on SCR $325_{1A}$ and $325_{1D}$ simultaneously by sending the corresponding gate signals to these two SCR's via the trigger signal bus 326. When it is required that the terminal $319_{1A}$ be connected to the negative terminal and the terminal $319_{1B}$ to positive, SCR $325_{C1}$ and $325_{1B}$ are turned on simultaneously. All other windings $319_2$–$319_N$ in the array 319 are connected to their respective SCR's and controlled under similar schemes. Depending on the design, there can be more than one windings in the array 319 excited simultaneously. Whatever the required switching pattern and its corresponding controlling scheme, the control logic 328 can be adequately programmed to govern the adequate turned-on and -off status of all the SCR's in the switch array 325.

Similar as in the case of the mechanical implementation of the apparatus of the invention, there are occasion in which the driving and driven roles of the two electromagnetic elements of the electromagnetic power-transmitting device are reversed within the same configurational arrangement for a particular apparatus of the invention. This permits the reversed direction of power flow as compared to that when the apparatus is operating in the normal direction of input-output power flow. This is possible based on the same principle as that of the conventional electric machines for which a motor is easily turned into a generator when the load becomes driving the rotor shaft that was originally delivering mechanical power.

For example, consider the situation in which the electromagnetic implementation of the apparatus of the invention depicted in FIG. 23 is operated in the electrical-to-mechanical mode of power transmission. In the apparatus of FIG. 23, the electromagnetic assembly 312 is a poly-phase winding wound on its physical body that is fixed stationary. The magnetization-redistributing electromagnetic winding assembly 311 is a DC armature, which receives its excitation via the rotary commutator 320. Assuming that the rotary commutator 320 is a mechanical rotary commutator having one single pair of carbon brushes.

When power excitation is fed to the poly-phase winding of the assembly 312 by the external electrical power source, it establishes a magnetic field with an angular speed determined by the frequency of the external electrical power source. This magnetic field drives the commutated element 311 via interaction with the other magnetic field established by the element 311 feeding its excitation by the rotary commutator 320. The imaginary commutation orientation vector of the rotary commutator 320, in this case the diametric axis of the pair of brushes, rotates synchronous to the magnetic field of the electromagnetic assembly or, in other words, rotates at the angular speed converted from the frequency of the external electrical power source. As described above, this allows the output shaft $332_M$ of the apparatus, the shaft of the commutated element 311, to drive the external mechanical load at any speed on the gear ratio axis of FIG. 20.

When the mechanical load becomes a mechanical power source and drives the rotary shaft $332_M$ of the commutated element 311, the poly-phase winding of the electromagnetic assembly 312 may now generate a poly-phase AC power to drive an electrical load coupled thereto. The regenerated AC electrical power can be controlled at the same frequency as that of the original electrical power source regardless of the angular speed of the mechanical power source now present at the rotary shaft of the commutated element 311. This can be achieved simply by controlling the angular speed of the imaginary commutation orientation vector at that particular angular speed of the original electrical power source. The regenerated AC power can even be controlled to be in-phase with the original external electrical power source simply by controlling the commutation orientation vector to be at the required phase angle with respect to the rotating magnetic field of the original power source.

This ability to regenerate an AC electrical power is useful in many industrial and transportation applications. For example, consider the situation in which the above-described electromagnetic implementation of FIG. 23 is used as the traction motor of a railway locomotive which it operates in the normal mode of electrical-to-mechanical power transmission. Electrical system of such a regenerative traction drive is illustrated in FIG. 30.

Assuming that the poly-phase winding for the electromagnetic assembly 312 is a two-phase system wound on the stationary stator frame of the apparatus, and a DC armature 311 for the magnetization-redistributing electromagnetic winding assembly is constructed on the rotor. The drawing schematically shows that the rotor of the DC armature 311 is coupled via a gearing system to the traction wheels of the railway vehicle which represents the mechanical load 382 of the system. Although the electrical power source 381 for electrified railway, as fed from the overhead power line 385 using a pantograph 386, is single-phase AC, the second phase with a 90-degree phase lag may be conveniently available. This second power phase can be obtained utilizing a unity transformer 387 feeding on the single-phase AC power source 381. This railway traction drive system operates in the electrical-to-mechanical mode of power transmission in the manner described in the previous paragraphs, extracting the single-phase AC line power from the utility company for driving the train to accelerate or ascend grades.

Consider the situation in which the train decelerates or descends grades. The commutated rotor 311 now becomes driven by the kinetic or potential energy of the train. By implementation of the control principle described above under control of the system control logic 380, the system of FIG. 30 which is based on the electromagnetic implementation of the apparatus of the invention may now be operated in the reversed direction of power flow. Mechanical power is now harnessed and may be directly fed back into the utility network distribution line 385 through the overhead pantograph 386 of the train. This regenerative braking is possible since all parameters of the regenerated AC power, including the frequency, the phase and the voltage can be controlled to be compatible to that generated by the utility company which is present in the distribution network.

Figure 30:
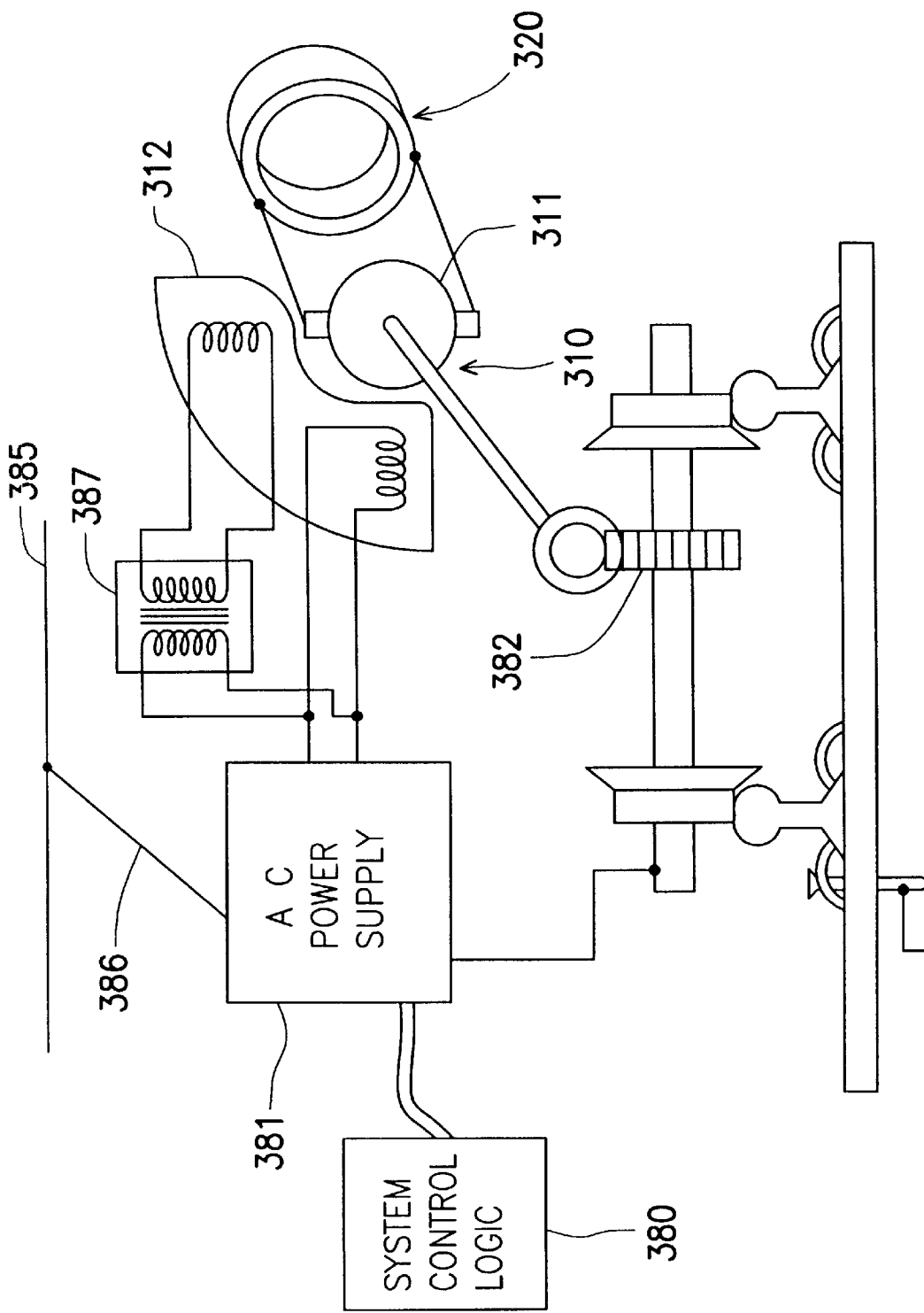
FIG. 30 illustrates the electrical system of an electromagnetic implementation of the power transmission apparatus of the invention utilized as the regenerative traction drive for electrified railway application.

In addition to the regenerative traction drive for electrified railway, electromagnetic implementation of the apparatus of the invention similar to that of FIG. 30 can be equally suitable for applications such as cogeneration and wind turbine power generation. Both the mechanical power produced by the steam turbine in the cogeneration facility and by the wind turbines of the wind mill typically have the same nature of changing characteristics as that produced by the railway trains during deceleration and grade descent. One common requirement for these applications is that the generated AC electrical power must be compatible to that in the utility network. Failure to achieve this would introduce high-frequency harmonics into the utility network that may damage equipments and appliances connected nearby.

Though, electromagnetic implementations of the apparatus of the invention for cogeneration and wind power generation typically operate in one direction of power flow only, i.e., in the mechanical-to-electrical mode of transmission. Electrical system of an electromagnetic implementation of the power transmission apparatus of the invention suitable for use as the electric generator for a cogeneration facility or a wind turbine generator system would be very similar to that exemplified in FIG. 30. Though not described herein, there are many other applications that may take advantage of the nature of simple regeneration control of the electromagnetic implementation of the power transmission apparatus of the invention.

For practical considerations, the excitation power source required for either or both of the electromagnetic interaction elements of the electromagnetic power-transmitting device in various embodiments of the invention may be incorporated directly into the apparatus itself. For example, the DC excitation power source, with its power rating relatively much smaller than the main power source, may be generated by a DC generator directly integrated in the apparatus itself.

Similar as is in the case of conventional electric machines, the electromagnetic implementation of the power transmission apparatus of the invention is preferably constructed into a device with a cylindrical hollow frame element and a cylindrical rotor element. When assembled, the cylindrical rotor element can be inserted into the hollow space of the frame element. Thus, the electromagnetic implementation of the apparatus such as that depicted in FIG. 21 may have the electromagnetic assembly 312 constructed as the cylindrical hollow frame element, and the magnetization-redistributing electromagnetic winding assembly 311 constructed as the cylindrical rotor element. Both elements may be supported with the their respective symmetric longitudinal axis coinciding each other, and the rotor element is positioned inside the hollow space of the frame element such that both the rotor and the frame are rotatable with respect to the coinciding axes and to each other. This configurational arrangement is one that is preferred for those apparatuses of the invention employing mechanical rotary commutator.

On the other hand, it is also possible to construct an apparatus with the structural configuration that is reversed with respect to that of FIG. 21. In such a configurational arrangement, the magnetization-redistributing electromagnetic winding assembly 311 is constructed as the cylindrical hollow frame element, and the electromagnetic assembly 312 is constructed as the cylindrical rotor element. In other words, the frame element becomes the one that is commutated by the rotary commutator. This may be an arrangement suitable for the electromagnetic implementations of the invention employing the power electronics rotary commutators.

Although the invention has been described in considerable detail with reference to certain preferred versions thereof, other versions are possible. For example, in the electromagnetic implementation of the apparatus of the invention, the electric machine utilized as the electromagnetic power-transmitting device may adopt the pan-cake structural configuration, in which interaction between the two electromagnetic elements takes place among the disk surfaces rather than the cylindrical periphery as is in the hollow cylindrical arrangement. Further, for the mechanical implementation of the power transmission apparatus adopting the parallel-axis configuration, a fixed-ratio coupling may be used to replace the variable-speed power-transmitting means that is integrated with the epicyclic gear train. When the gear ratio of this fixed-ratio coupling is selected to be close to point C on the driven element speed line 103 of FIGS. 5–7 and 8–10, the resultant power transmission apparatus becomes a large-reduction-ratio gear train. Such a large-reduction fixed-ratio gear drive is simple to construct and is able to handle large power. Therefore, the spirit and scope of the appended claims should not be limited to the description of the preferred versions contained herein.

What is claimed is:

1. A power transmission apparatus for transmitting power, the apparatus having an input shaft for receiving mechanical power from an external power source and an output shaft for delivering mechanical power to an external load, the power transmission apparatus comprising:

an eddy-current coupler comprising a driving element and a driven element, the eddy-current coupler is connected to the input shaft and receives the external mechanical power at an input angular speed, and the driving and the driven elements operate at a driving and a driven angular speed respectively for transmitting the mechanical power via interaction between the driving and the driven elements, wherein said driving and driven angular speeds are variable with respect to each other; and an epicyclic gear train comprising a first gear, a second gear and a third gear, the second gear rotates in the same rotational direction as the third gear and at an angular speed slower than the third gear when the third gear is driven with the first gear held stationary, the third gear is connected to the driving element of the eddy-current coupler, the second gear is connected to the driven element of the eddy-current coupler, and the first gear is connected to the output shaft; whereby the power-transmitting interaction of the eddy-current coupler operating at the driving and the driven angular speeds is redistributed onto the output shaft by the epicyclic gear train, and the output shaft delivers the mechanical power to the external load at an output angular speed.

2. A power transmission apparatus for transmitting power, the apparatus having an input shaft for receiving mechanical power from an external power source and an output shaft for delivering mechanical power to an external load, the power transmission apparatus comprising:

a power-transmitting means comprising an eddy-current coupler, the eddy-current coupler comprising a driving element and a driven element, the power-transmitting means is connected to the input shaft and receives the external mechanical power at an input angular speed, and the driving and the driven elements operate at a driving and a driven angular speed respectively for transmitting the mechanical power via interaction between the driving and the driven elements; and an epicyclic gear train comprising a first gear, a second gear and a third gear, the second gear rotates in the same rotational direction as the third gear and at an angular speed slower than the third gear when the third gear is driven with the first gear held stationary, the third gear is connected to the driving element of the power-transmitting means, the second gear is connected to the driven element of the power-transmitting means, and the first gear is connected to the output shaft; whereby the power-transmitting interaction of the power-transmitting means operating at the driving and the driven angular speeds is redistributed onto the output shaft by the epicyclic gear train, and the output shaft delivers the mechanical power to the external load at an output angular speed.

* * * * *